(12) United States Patent
Leong et al.

(10) Patent No.: US 10,984,579 B2
(45) Date of Patent: Apr. 20, 2021

(54) PLAYBACK FOR EMBEDDED AND PRESET 3D ANIMATIONS

(71) Applicant: Microsoft Technology Licensing, LLC, Redmond, WA (US)

(72) Inventors: Aimee Leong, Redmond, WA (US); Matt Kernek, Redmond, WA (US); Stephanie Horn, Redmond, WA (US); Jie Li, Redmond, WA (US); Varun Pandey, Redmond, WA (US); Mikko Mannisto, Redmond, WA (US); Eduardo Lemus Velazquez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/427,700

(22) Filed: May 31, 2019

(65) Prior Publication Data

US 2020/0066022 A1 Feb. 27, 2020

Related U.S. Application Data

(60) Provisional application No. 62/723,190, filed on Aug. 27, 2018.

(51) Int. Cl.
*G06T 13/80* (2011.01)
*G06F 3/0481* (2013.01)
*G06F 3/0482* (2013.01)
*G06T 17/00* (2006.01)

(52) U.S. Cl.
CPC ............ *G06T 13/80* (2013.01); *G06F 3/0482* (2013.01); *G06F 3/04817* (2013.01); *G06T 17/00* (2013.01)

(58) Field of Classification Search
CPC ..... G06T 13/80; G06T 17/00; G06F 3/04817; G06F 3/0482
See application file for complete search history.

(56) References Cited

U.S. PATENT DOCUMENTS

2012/0313926 A1* 12/2012 Rolleston ............... G06T 15/00
345/419
2014/0079371 A1* 3/2014 Tang ............... H04N 21/234345
386/240

(Continued)

OTHER PUBLICATIONS

Widlund, Emil, "Introducing Framer Form", Retrieved From: https://blog.framer.com/introducing-framer-form-288fcb162ca2, Apr. 3, 2018, 7 Pages.

(Continued)

*Primary Examiner* — Haixia Du
(74) *Attorney, Agent, or Firm* — Schwegman Lundberg & Woessner, P.A.

(57) ABSTRACT

A system and method of playing back 3D animations includes receiving user selection of a 3D file that contains animation parameters of an animated 3D model such as a preset animation or an embedded customized animation and inserting the animated 3D model into a 2D display canvas while preserving the animation parameters of the animated 3D model described in the 3D file. The animated 3D model is played and paused on the 2D display canvas under user control independent of a main thread that enables interaction with and editing of other content besides the animated 3D model in the 2D display. User adjustment of animation parameters of the animated 3D model during playback are received and the animated 3D model with the received user adjusted animation parameters are presented to the 2D display canvas on a display device.

20 Claims, 16 Drawing Sheets

(56) References Cited

U.S. PATENT DOCUMENTS

| | | | | |
|---|---|---|---|---|
| 2014/0141397 | A1* | 5/2014 | Dunn | G09B 5/02 |
| | | | | 434/262 |
| 2014/0195963 | A1 | 7/2014 | Cheung et al. | |
| 2015/0095187 | A1* | 4/2015 | Ainsworth | G06Q 30/0633 |
| | | | | 705/26.8 |
| 2015/0339841 | A1* | 11/2015 | Carter | G06F 40/106 |
| | | | | 345/473 |
| 2017/0046962 | A1* | 2/2017 | Shipley | G08G 5/0013 |

OTHER PUBLICATIONS

Knyazev, et al.,"gITF Specification", Retrieved From: https://web.archive.org/web/20190816164135/https://github.com/KhronosGroup/gITF/tree/master/specification/2.0, Aug. 16, 2019, 72 Pages.

Cozzi, Patrick, et al., "gITF Ecosystem", Retrieved From: https://www.khronos.org/assets/uploads/developers/library/2018-gdc-webgl-and-gltf/gITF-GDC_Mar18.pdf, Mar. 1, 2018, 17 Pages.

Kozak, Martin, "Thread Computing", Retrieved From: https://en.wikipedia.org/w/index.php?title=Thread_(computing)&oldid=51410782, May 3, 2006, 9 Pages.

"International Search Report and Written Opinion Issued in PCT Application No. PCT/US19/038843", dated Aug. 21, 2019, 14 Pages.

Vij, Ayush, "How to Insert Animated 3D Models into a PowerPoint Presentation", Retrieved From: https://www.thewindowsclub.com/insert-animated-3d-models-powerpoint-presentation, Apr. 17, 2018, pp. 1-7.

* cited by examiner

PLAYBACK FOR EMBEDDED AND PRESET 3D ANIMATIONS

CROSS-REFERENCE TO RELATED APPLICATION

This application claims priority to U.S. Provisional Patent Application Ser. No. 62/723,190, entitled "Playback for Embedded and Preset 3D Animations," filed Aug. 27, 2018, which is incorporated herein by reference.

BACKGROUND

Certain 3D file formats contain customized animation information embedded into the file that enables animation of 3D models in a custom way, e.g., enabling an avatar to run, walk, swim, dance, etc. However, playing these animations generally requires a niche skill set and professional software. For example, Framer Form software exposes an API for rendering 3D-graphics in Framer Prototypes that provide the ability to add animated 3D models to a prototype. However, the Framer Form software requires professional skills in coding and prototyping and is not adapted for productivity enhancement applications such as word processing applications, spreadsheet applications, slide presentation applications, and email applications. Similarly, Maya and Cinema 4D are professional software applications that enable 3D modelers to create, define and play animated models on a two-dimensional display canvas with high levels of fidelity and control. As with Framer Form software, the Maya and Cinema 4D software requires specialized knowledge of 3D modeling to use and is not adapted to use in productivity enhancement applications.

In other applications, the WINDOWS® Mixed Reality Viewer (MRV) is a mixed reality platform that provides holographic and mixed reality experiences where a live presentation of physical real-world elements is incorporated with that of virtual elements such that they are perceived to exist together in a shared 3D environment. The MRV supports a 3D model viewing application that supports animated models. However, users of the MRV may only view the animated 3D model.

SUMMARY

Various details for the embodiments of the inventive subject matter are provided in the accompanying drawings and in the detailed description text below. It will be understood that the following section provides summarized examples of some of these embodiments.

Various techniques are described whereby 3D file formats containing animation information may be played back without a particular skill set or professional software so that animated 3D models may be used with static 3D models in productivity applications such as word processing applications, spreadsheet applications, slide presentation applications, and email applications to increase productivity. In particular, the systems and methods described herein extend current support for 3D models in productivity applications to include user-controlled 3D animated models that will animate in the editor whereby users can easily explore the available 3D animations and adjust the animation that plays, repeat loops, and other playback parameters using conventional display interfaces such as a ribbon of a word processing application or slide presentation software. Users may also easily play and pause embedded or preset 3D animations from the ribbon or a user interface on the animated object without detracting from the surrounding content. To provide consistency across applications, the 3D animations may emulate the animation patterns and user interfaces of existing productivity applications such as word processing applications, spreadsheet applications, slide presentation applications, and email applications.

In sample embodiments, the above-mentioned and other features are provided by a computer-implemented method that includes the steps of receiving user selection of a 3D file that contains animation parameters of an animated 3D model, inserting the animated 3D model into a 2D display canvas while preserving the animation parameters of the animated 3D model described in the 3D file, wherein the 2D display canvas is associated with a main thread that enables interaction with and editing of other content besides the animated 3D model in the 2D display canvas, playing and pausing the animated 3D model on the 2D display canvas under user control independent of the main thread, receiving user adjustment of animation parameters of the animated 3D model during playback, and presenting the animated 3D model with user adjusted animation parameters to the 2D display canvas on a display device of the computer.

In the sample embodiments, the animated 3D model loops continuously during playback and a default animation of the animated 3D model plays upon insertion or opening of the animated 3D model into the 2D display canvas.

In other sample embodiments, a worker thread separate from the main thread plays and pauses the animated 3D model. In such an embodiment, receiving user adjustment of animation parameters of the animated 3D model during playback comprises the worker thread passing animation progress data to the main thread during playback of the animated 3D model while the main thread receives user adjustment of the animation parameters of the 3D model.

In still other sample embodiments, respective frames of the animated 3D model are presented on the 2D display canvas at different rotated positions of the animated 3D model for user selection. The different rotated positions of the animated 3D model presented for selection represent the different respective rotated positions of the animated 3D model in respective playbacks of the animated 3D model. The respective frames of the animated model may be presented on a ribbon of the 2D display canvas for user selection. Other selection options for presenting the animated 3D model on the ribbon of the 2D display canvas include: 3D files containing animation parameters of respective animated 3D models for user selection, respective views of the selected animated 3D model for user selection, or respective scenes of the selected animated 3D model for user selection. The respective scenes may represent respective embedded customized animations of the selected animated 3D model.

In yet other sample embodiments, presenting the animated 3D model with user adjusted animation parameters to the 2D display canvas comprises fitting an entire animation scene of the animated 3D model in a designated area within the 2D display canvas so as not to affect the other content besides the animated 3D model in the 2D display canvas. The animated 3D model also may be represented using a frame of a selected animation scene in areas of the 2D display canvas where the other content besides the animated 3D model should not animate.

As discussed herein, the logic, commands, or instructions that implement aspects of the methods described above may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

The description provided herein is generally directed to products provided by Microsoft Corporation including WORD™ word processing applications, EXCEL® spreadsheet applications, POWERPOINT® slide presentation applications, and the platforms that support 3D, including, for example, OFFICE365® and Win32. As 3D support expands to other platforms, it will be appreciated that the 3D animations features described herein may be added to other platforms (e.g., Paint 3D, gaming, augmented reality/virtual reality, 3D printing, WinRT, macOS, iOS, and the like) as well to provide feature parity. It also will be appreciated by those skilled in the art that the 3D animations features described herein may be used with other productivity enhancement products available from Microsoft Corporation and other vendors.

Certain 3D file formats can contain customized animation information embedded in the file. For example, file formats that support embedded animations supported by word processing applications include Filmbox (FBX) and gl transmission format (glTF), which is a file format for 3D scenes and models using the JSON standard. GLB may also be used, which is a file format (.glb) that is a binary form of glTF that includes textures instead of referencing them as external images. Certain available transcoders (e.g., glTF SDK) will retain this animation information, from FBX to glTF, and glTF to glTF.

Figure 1:
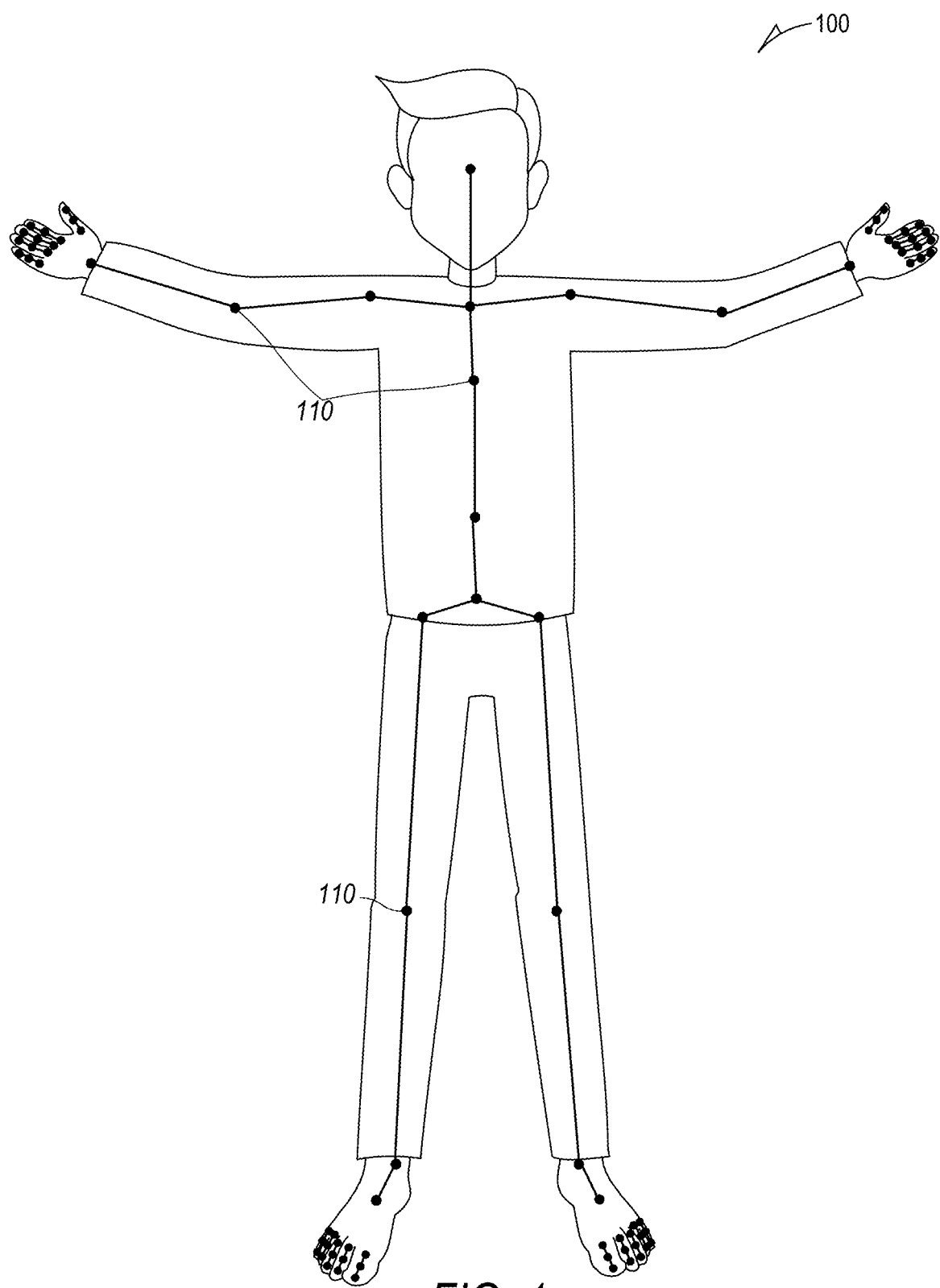
FIG. 1 illustrates a 3D model's skeleton for use in creating embedded animations.

To create customized animations, 3D model creators define a series of keyframes that are saved to the 3D file for an application to playback. This way, the 3D content can be brought to life in a highly relevant and life-like way. Embedded animations may utilize a 3D model's skeleton 100, which is a tree of nodes 110 rigged by the 3D modeler, as illustrated in FIG. 1. Other types of animations besides skeletal animations may also be used. In this example, the animation keyframes utilize the skeleton 100 by translating, rotating or scaling on a given node 110 in the skeleton, to make, for example, a 3D avatar dance or walk.

Word processing applications, spreadsheet applications, and presentation software applications allow users to insert an animated 3D model into a 2D display canvas. For example, the 3D model may be presented within a viewport that is maintained by the computer system as a two-dimensional object in a two-dimensional canvas. As used herein, a canvas is a two-dimensional digital workspace within which the computer system maintains and manipulates two-dimensional objects to be displayed in the canvas. For example, a canvas may be a page of a word processing document in a word processing application, a spreadsheet in a spreadsheet application, a slide in a slide presentation application, a page for a body of an email in an email application, or a page of a note in a note-taking application. Continuous real-time rotation and other manipulations of the three-dimensional model can be performed through a viewport in the two-dimensional canvas, which may be a bounded canvas. For example, the other types of manipulations may include zooming and panning.

In previous 3D animation systems, on insert, the animated 3D model is converted to a static model during the transcoding process. As a result, any animation information is stripped and the resulting .glb file is a static 3D file. When rendering with other media content, the static 3D model renders on the main thread, which is a sequence of programmed instructions that is typically a component of (and shares resources of) a process managed independently by the scheduler of the operating system. All 3D editing of the 3D model (e.g., 3D rotate) is performed on the main thread which has precluded the ability to explore animations or to play/pause animations.

Also, where animation is not appropriate (e.g., thumbnails, print preview, etc.), a still image of the static model at its current x,y,z rotation is displayed. Also, a bounding box is tightly fitted to the static model image and the controls for manipulating the 3D model (e.g., move, resize, 2D rotate, etc.) are applied to the bounding box.

To further enhance productivity in productivity applications, a 3D animation system and method is provided that expands upon the previous 3D animation system to permit users to insert a fully animated 3D model into a 2D display canvas without losing the animation features during the transcoding process. In sample embodiments, the transcoding process preserves the animation information of the inserted animated 3D model in the resulting .glb file. Also, since animated 3D models cannot render on the main thread as it would interfere with the user's ability to interact with and edit other content in the document, a new worker thread is created that runs concurrently with the main thread to render the animated 3D content ambiently in the background while the main thread separately responds to user input to manage the static (non-animated) content. In addition to multi-threading, means for playing and pausing the animated 3D model on the 2D display canvas under user control without interacting with the main thread include non-blocking input/output and/or Unix signals adapted to provide similar results. The display software also respects the z-order of the text layout options of surrounding content (including any animated content). Animation decisions may be made for the user by using a default model that plays a first animation in the 3D animation file and loops continuously.

Controls are also provided that permit the user to modify the 3D animation for playback. Since the 3D editing of the model is performed on the main thread, to continue animating during 3D editing, the worker thread continuously passes animation progress data to the main thread while the 3D editing is occurring. The user may thus explore animations and play/pause in the document as the control information and progress update information is passed between the main thread and the worker thread, which extends existing 3D animation concepts in productivity applications to include embedded 3D animations as well when displaying data to the 2D display canvas.

In views where 3D animation is not appropriate, an image of a poster frame of the playing animation may be provided at the 3D model's x,y,z rotation. If the animation is changed, then the poster frame changes to a frame in the animation. Also, the bounding box may be fitted to the entire animation scene whereby all areas of the 3D model may traverse in the animation. In sample embodiments, the bounding box stays within proportional area in the document so as not to disrupt surrounding media and text in the document, spreadsheet, or presentation. For example, if the first animation is a shark swimming in place, then a second animation may be the shark swimming across a large area. Rather than the bounding box suddenly filling the entire document when switching from the first animation to the second animation, the shark is shrunk to swim in an area contained to its relative canvas in the document. In this manner, the presentation to the 2D display canvas takes into account other surrounding content. It will be appreciated that the bounding box is typically not shown on the 2D display canvas, and thus is not shown on the 2D display canvas in the illustrated embodiments.

In sample embodiments described herein, systems and methods are provided for playing embedded animations in the editor of productivity applications, including in slideshow mode of slide presentation applications, and for playing 3D preset animations in the editor of word processing and spreadsheet applications. The user interface also enables users to pause an animation, edit a document while the animations are playing in the editor, change to 3D animation for a given model, set an animation to run ambiently in the background, adjust how many times the animation loops, toggle as to whether embedded animations will automatically play in the editor or not, sequence multiple embedded and preset 3D animations, copy-paste a 3D model, and disable animations in the editor. To do so, a new 3D animation platform is provided in the 2D display canvas, as described herein.

At the outset, it should be noted that slide presentation software may differ from word processing and spreadsheet application software as slide presentation software may already have an animation framework. For this reason, sample embodiments may be designed to work with the slide presentation animations for consistency, and the slide presentation applications may differ slightly from other productivity applications. The UI design that is shared across all of these applications will be described first, and UI application specific designs will be explained afterwards. The system implementation will then be described.

UI and Commands

Figure 2A:
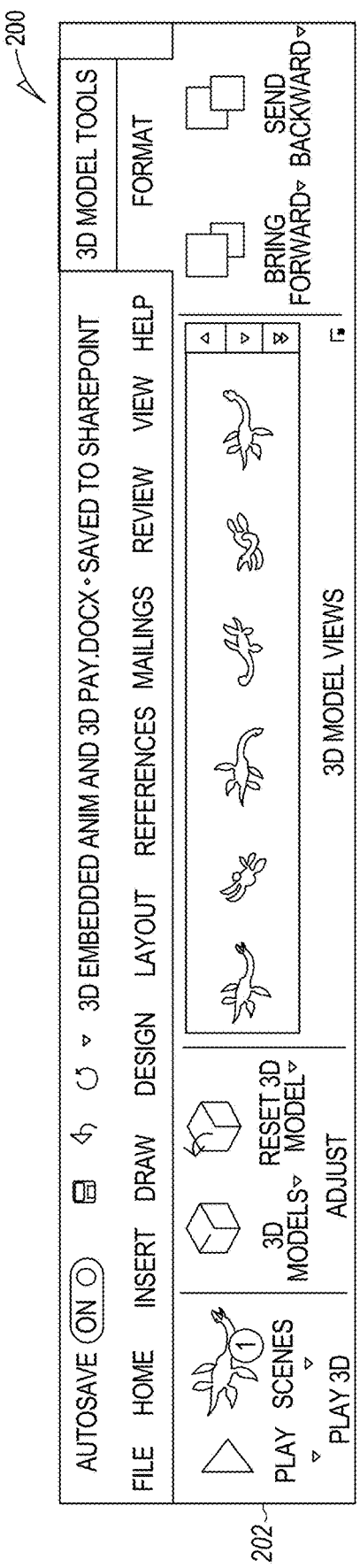
FIG. 2A illustrates a sample user interface (UI) for playing back 3D animations in a sample embodiment.
Figure 2B:
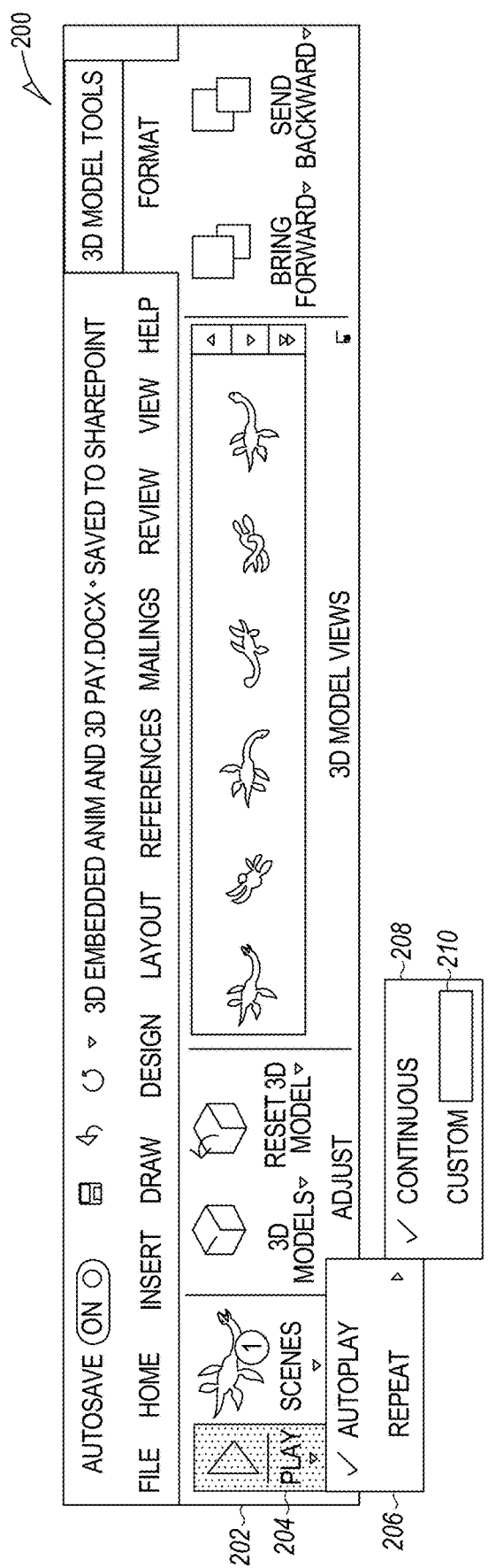
FIG. 2B illustrates the sample UI of FIG. 2A where the Play 3D split button has been selected to enable the user to select "AutoPlay" or "Repeat" for the selected animation.

In a sample embodiment, a new user interface (UI) section is added to the user interfaces of productivity applications for playing 3D animations. For example, a new Play 3D section in the 3D model Tools Contextual Ribbon of POWERPOINT® provided by Microsoft Corporation may be modified to contain all the Play 3D commands to set and play 3D animations in the editor. As shown in FIG. 2A, this new UI section 200 may be similar to playback commands for slideshow animations and video. When clicking the Play 3D split button 202 dropdown, the UI section 200 of FIG. 2B appears to enable the user to select "AutoPlay" at 204 or "Repeat" at 206. The AutoPlay toggle 204 defines if the animation is a push or a pull to the user. When it is on, the model starts animating as soon as it loads into view. When it is off, the model only animates when the user explicitly clicks Play. When turning off, if the model is playing, the model should stop playing and return to the first frame. Typically, the default is on as the intended behavior for animated models is that they should animate.

On the other hand, if "Repeat" is selected at 206, the user is also provided the option at 208 to select "continuous" or to specify at 210 the number of times the animation is to repeat. Repeat 206 is similar to the repeat options of slide presentation software animations: the option to play continuously or set a custom amount. The custom amount will be a positive number. If an input is unable to be placed in a drop-down, then a pre-defined list of repeat amounts may be listed and selectable for the custom amounts at 210, similar to animations repeat in slide presentation software. The default will be continuous (208) in sample embodiments.

In sample embodiments, the selection information will be saved to file and persist on copy-paste. In this fashion, the bottom half of the split button 202 contains parameters around the play, so the user can control the playback.

Figure 2C:
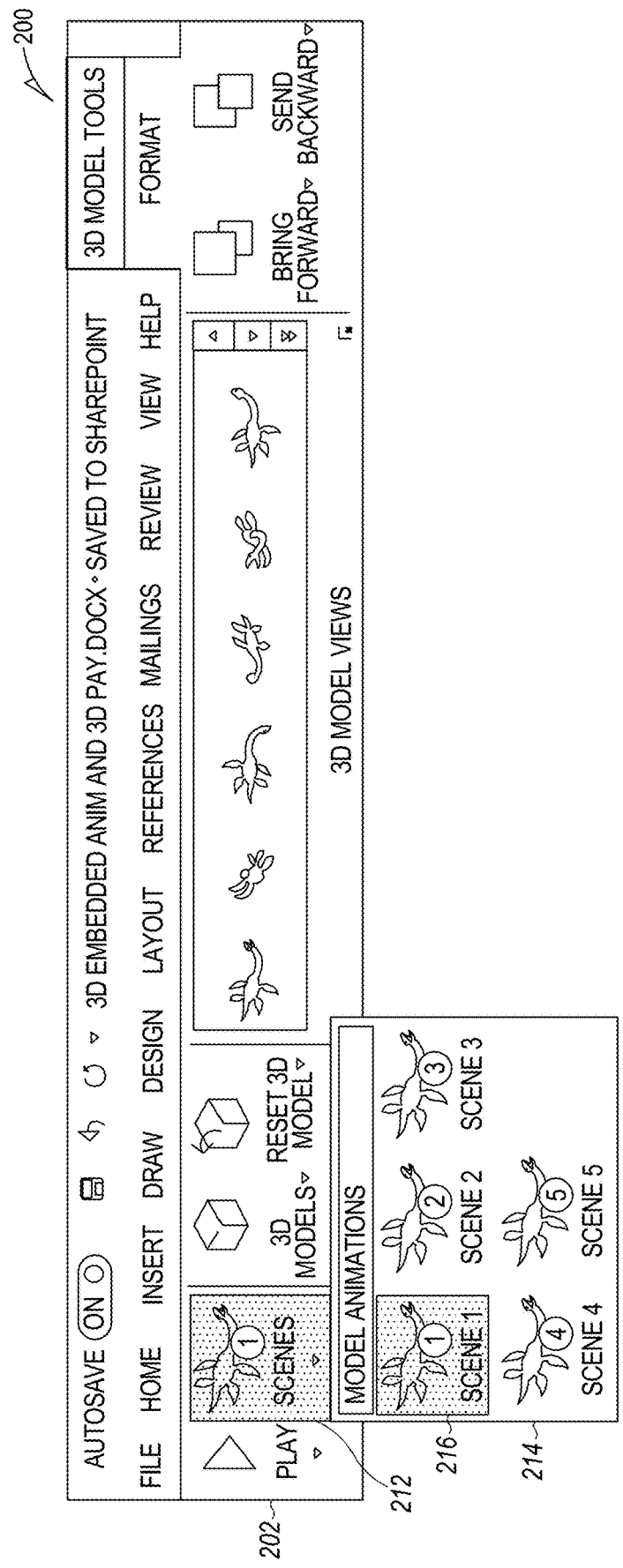
FIG. 2C illustrates the sample UI of FIG. 2A where the user has selected the "Scenes" gallery dropdown to show the scene options.

In addition, when the user selects the "Scenes" gallery dropdown 212, the scene options 214 appear, as shown in FIG. 2C. As illustrated in FIG. 2C, the ribbon icon 212 of the Play 3D "Scenes" gallery is the thumbnail of the currently selected default animation of the scene options 214. This way, the user can reference what animation is playing. When clicking Scenes icon 212, the Play 3D scene options 214 drop down to reveal the embedded animations in the 3D model. The thumbnail for these will be a representative frame of the animation with a localized numbered badge. If this is too expensive to process for presentation, a static icon with no badge may be used as the thumbnail instead.

The badge will provide the user with a handle to learn the animations in the 3D model and will ensure that there is a delta between the thumbnails if the first frame is similar between animations. Additionally, if the 3D model is not in view during the first frame (e.g., negative z-axis), then the badge will show that it is not a bug. If this is too expensive to process for presentation, a generic thumbnail may be used rather than the first frame of the model.

In sample embodiments, generic naming of 'Scene 1', 'Scene 2 . . . may be used to name the Scenes as illustrated in FIG. 2C. Instead of the generic naming, the animation names contained within the animated 3D file may be surfaced. Also, when hovering over the gallery item 214, a tooltip may appear with the full animation name. In this way, if the animation name truncates, the user will have a way to access the full animation name. When hovering over the gallery items 214, the animated model in the editor may preview the animation scene so the user can easily explore the available scenes before selecting one. The UI 200 may limit the maximum number of embedded animations that will be revealed in the gallery 214 due to canvas limitations.

Each animated 3D model typically has only one animation selected, so that the application software knows what to play when the user clicks play. This is called the default animation. The current default animation 216 will be indicated as selected in the Play 3D scenes gallery 214 (for example, by highlighting as indicated). On insert, if embedded animations exist, the default animation 216 is the first embedded animation. The user can adjust the default by clicking any of the animations in the Play 3D gallery 214. The default Play 3D animation 216 is persisted on copy-paste and between sessions.

Figure 2D:
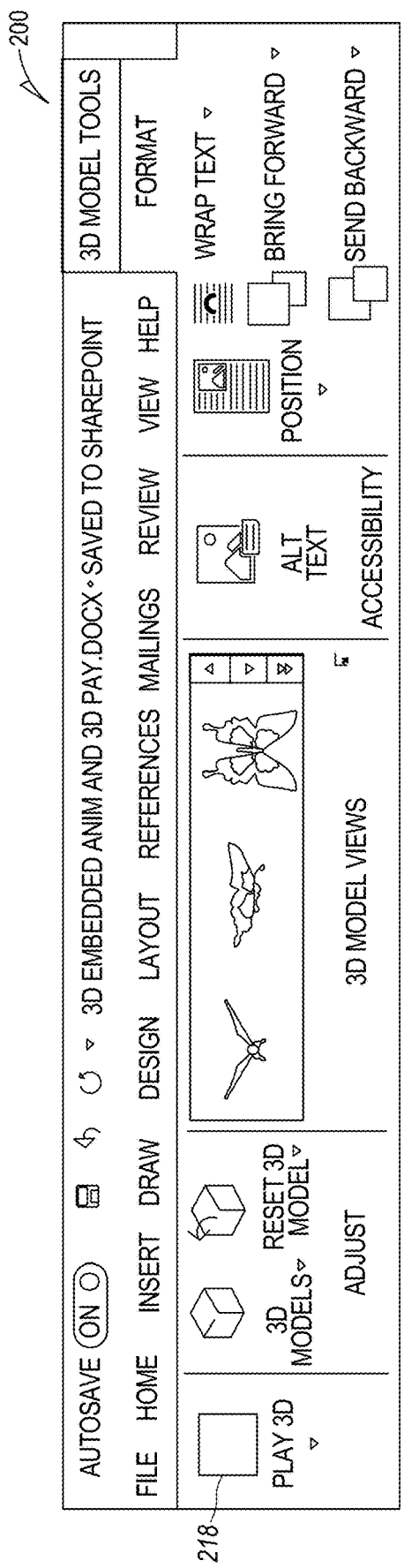
FIG. 2D illustrates the sample UI of FIG. 2A in compressed form.
Figure 2E:
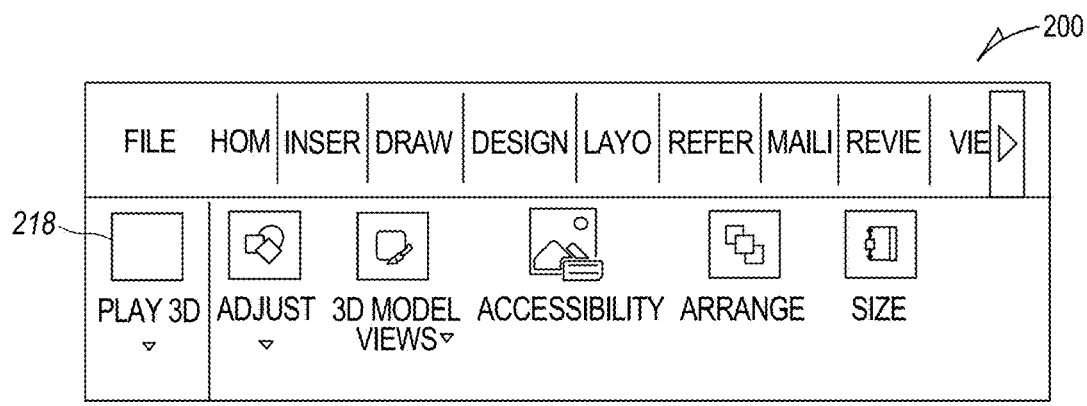
FIG. 2E illustrates the smallest scaling of the sample UI of FIG. 2A.

In the sample UI 200, the Play 3D section 218 has no special scaling logic. The default behavior will be the Play 3D section 218 remains until there is more room, and each section pops into its own dropdown from left to right. Since the Play 3D section 218 is the furthest to the left in UI 200, it will be the first to pop into a dropdown as shown in FIG. 2D. FIG. 2E shows the smallest scaling of the UI 200 in a sample embodiment.

In the sample UIs, if multiple objects are selected, where some are animated 3D models and others are not, then the Play 3D scenes gallery 214 will be greyed-out, but the Play/Pause split button 202 will be enabled. When clicking Play/Pause or adjusting the AutoPlay or Repeat values, this will apply to all animated 3D models selected. This way, the user can quickly pause multiple models if it is distracting the user's focus or adjust the parameters of multiple models that are in a set, rather than needing to do these commands one by one. For the Play/Pause, if all are playing, then the Play/Pause split button 202 is a Pause. If all are paused, then the Play/Pause split button 202 is a Play. If mixed, then the Pause is shown, for the use case when users want to quickly pause all animated content.

When clicking the existing Reset 3D Model command, the animated model should be restored to its insert defaults. These insert defaults are:
 Default Animation is the first embedded animation in the file
 Repeat=Continuous
 AutoPlay=true
The UI commands for Play 3D 218 should be disabled when the 3D animation model is locked.

Figure 3A:
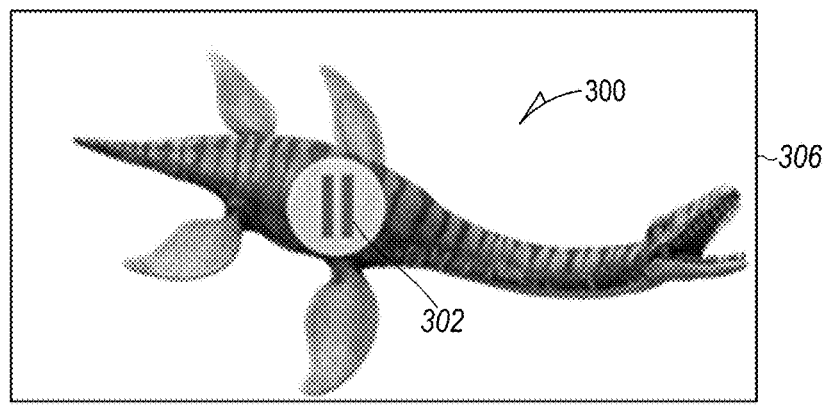
FIG. 3A illustrates a pause button over the 3D animation model while it is animating in a sample UI.

As shown in FIG. 3A, while the 3D animation model is animating, if the user hovers over the 3D animation model 300 in the 2D display canvas, a custom Pause button 302 may appear at the center of the bounding box 306 (like 3D rotate), and if clicked, the 3D animation model 300 may pause at its current frame. Once clicking this Pause button 302, the 3D animation model 300 should remain unselected. This Pause button 302 is the same as the Pause ribbon button 202.

Figure 3B:
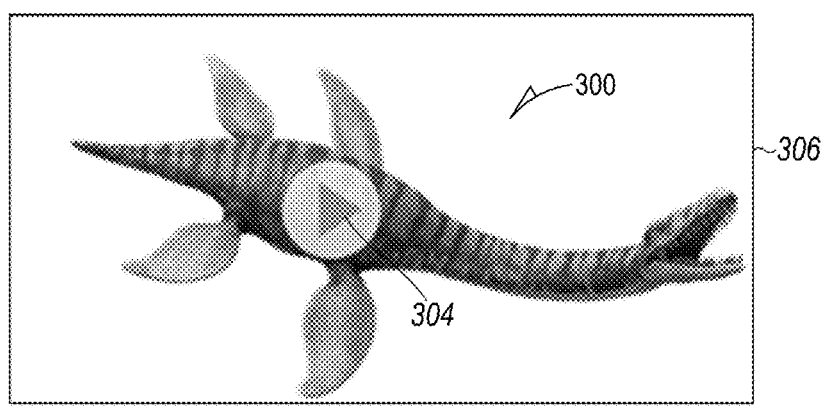
FIG. 3B illustrates a play button over the 3D animation model while the model is paused in a sample UI.

On the other hand, while the 3D animation model is not animating, if the user hovers over the 3D animation model 300 in the 2D display canvas, a custom Play button 304 may appear at the center of the bounding box 306 (like 3D rotate) as shown in FIG. 3B, and if clicked, the 3D animation model may play from where it left off. Once clicking this Play button 304, the 3D animation model 300 should remain unselected. This Play button 304 is the same as the Play ribbon button 202.

In sample embodiments of the UI 200, a majority of on-object UI handles have a cursor state on hover and click. When hovering or clicking the Play/Pause button 202, the cursor will indicate Play/Pause.

While the 3D animation object 300 is not selected, if the user hovers over the animated 3D model 300 or within the bounding box 306, then the Play/Pause button 302 or 304 may appear. The bounding box 306 is included as the 3D animation model 300 may be small or translating across the page, so the user may not be able to easily hover over the actual 3D model. The bounding box 306 will also trigger the hover state. In sample embodiments, the Play/Pause button 302 or 304 may appear at the center of the bounding box 306, rather than moving with the animated 3D model 300.

Once hovered, if the 3D animation model 300 or bounding box 306 and not the pause button 302 is clicked in the 2D display canvas, the usual bounding box 306 and selection handles appear, and the pause button 302 disappears and is replaced by the 3D Rotate handle. If the user deselects then hovers again, the Play/Pause button 302/304 is shown again. These controls make it easy for the user to click around and to interact with the 3D animated model 300 in the 2D display canvas so that the user can easily explore, learn and feel powerful with quick actions and rapid feedback.

When the user hovers over the 3D animated model 300 for a prolonged period, their intent is unlikely to pause/play which is typically an immediate action. Instead of requiring the user to move their mouse to view the full animation, the Play/Pause buttons 302/304 may fade out after a period of time (e.g., 2 seconds). If the user moves their mouse again, the Play/Pause buttons 302/304 may reappear.

Like 3D rotate, if the bounding box 306 is too small for the Play/Pause buttons 302/304 to be usably displayed, then they will not be shown. If the bounding box 306 is later resized to be large enough to usably display, the Play/Pause buttons 302/304 will reappear. The user can still Play/Pause on hover over the hit area of the Play/Pause command, which will still be indicated by the cursor. However, no UI buttons are shown.

Playback

In sample embodiments, when a 3D animation model 300 is in Object mode, the bounding box 306 is calculated on the current rotation of the 3D animation model 306. When the view is adjusted via 3D Rotate, View Gallery or other command, the bounding box 306 is recalculated to tightly fit this rotation. When an animated model's rotation is adjusted, that frame of that animation is not necessarily representative of the whole animation, so the logic for the bounding box 306 is adjusted. For 3D animated models, the bounding box 306 will be calculated to fit to the entire animation scene (all areas the model may traverse in the animation) and to ensure the 3D space is large enough so the near and far panes of the 3D scene do not clip the model while traversing. Also, the bounding box 306 stays within a proportional area in the document so as not to disrupt surrounding media and text in the document. For example, if the first animation is the shark swimming in place and the second animation is the shark swimming across a large area, then rather than the bounding box suddenly filling the entire document, the shark shrinks to swim contained to its relative space in the document.

With this design, the bounding box 306 should be calculated in all areas that change the 3D model's view (e.g., 3D Rotate, Format Object Task Pane (FOTP), Views Gallery) but also when the default 3D animation is changed in the Play 3D scenes gallery 214.

When a 3D animation is playing, the model's selection handles and bounding box 306 are hidden. The bounding box 306 still exists; however, it is not visible. Therefore, when the 3D animation is placed in a word processing document, for example, the text wrapping should not change. Thus, in areas of the 2D display canvas that should not animate, the 3D animated model 300 may be represented using a frame of the animation scene that is selected, and the frame need not be seen.

When selecting the 3D animation model 300, the selection handles and bounding box 306 re-appear, and if the 3D animation model 300 is animating, it should continue. The 3D animation model 300 should continue animating through all editing activities, unless that editing activity is incompatible with 3D animation rendering. For these activities, the 3D animation model 300 should be paused during editing and continue where it left off once the activity is complete. Such editing activities may include: 3D Rotate, Pan & Zoom, Resize, Move, 2D Rotate, Reset, Views Gallery, Object Arrange Commands, 2D Effects, etc.

In sample embodiments, when a 3D animation model 300 is 3D-rotated, the current paused skeletal position of the 3D animation model 300 will be observed, rather than the bind position. For example, if a user would like to explore the 3D model of a lion as it is roaring, they can pause when the lion is at a roar position, then 3D rotate the 3D model to observe the different angles of this skeletal position of the lion.

Figure 4A:
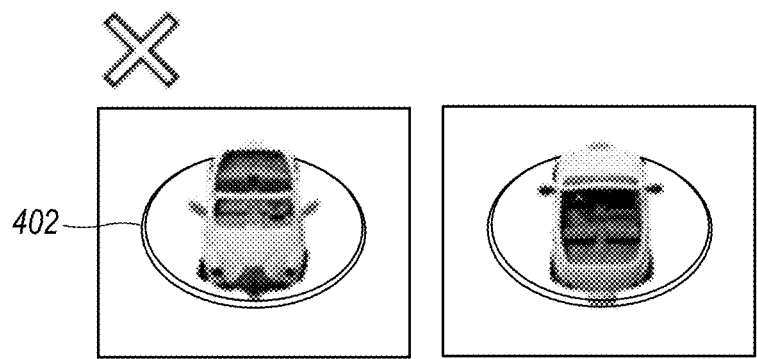
FIG. 4A illustrates turntable rotation of a preset 3D object model on the model's apparent axis in a sample UI.
Figure 4B:
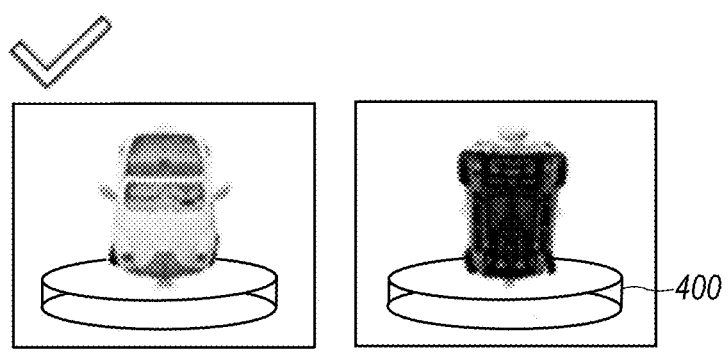
FIG. 4B illustrates turntable rotation of a preset 3D object on the model's true axis in a sample UI for consistency with presentation software 3D animations.

For preset animations used in other software applications, such as Turntable used in Microsoft's Office, a 3D preset model is selected and manipulated using tools such as pan & zoom, turntable, and jump & turn. If the 3D animation model 300 is rotated on the turntable, the 'table that turns' also rotates. For such preset animations, the animation should occur on the model's true axis 400 for consistency with presentation software 3D animations as shown in FIG. 4B, rather than their apparent axis 402, as illustrated in FIG. 4A.

The 3D animations also respect the document rotation selected by the user. For example, if the user inserts an avatar and rotates it to face backwards, the embedded 3D animation plays on the 3D animation model 300 as it faces backwards (as opposed to rotating the model to the first insert frame before playing). This way, the animations can be viewed at all angles, and the content creator is able to define the angle of view required.

Both the preset and embedded animations may utilize translation values, meaning that the animation may move the 3D animation model 300 outside the bounding box 306. The behavior here will mimic slideshow animations of presentation software. In Autofit Mode of word processing, spreadsheet, and slide presentation applications, the bounding box 306 may be ignored, and the 3D model may animate on top of a document (i.e., no text wrapping will occur). However, the 3D animation model 300 will respect the z-order of surrounding content. In Pan & Zoom Mode, the user's framing will be respected and even though the bounding box UI is hidden, it will clip the 3D animation model 300 as it animates to maintain the intended frame.

All animations in the 2D display canvas may register with a global timer so animations are in-sync even if they are in different parts of the document or running at different frames per second (due to model complexity or other). This means if multiple models are turntabling ambiently in different parts of the document, they should appear to have started together.

In sample embodiments, the 3D playback system described herein may support one embedded and many preset animations to play simultaneously. For example, an avatar may be automated to walk while turning on a turntable. However, in the case of multiple animations, if the Repeat value is an integer rather than Continuous, then the Repeat value should apply to the longer animation. For example, if embedded animation 1 is on an animation cycle that goes for 2 seconds, and the user stacks this with a Turntable which takes 20 seconds, the embedded animation should loop until the longer animation finishes.

The document skeleton of an animated model is called a bind position. This is the position all animation steps reference, and typically is not a consumer-ready skeletal position (e.g., a t-pose for avatars). Thus, for all places where a fallback image is required, a poster frame may be used rather than the document bind position. For example, the poster frame may be the first frame of the default animation, at the user's document rotation. In other embodiments, additional user interfaces may allow users to select a custom poster frame.

When saving a document as a non-animated file (e.g., PDF or PNG), the poster frame may be used. However, when saving the document as an animated file (e.g., MP3 in POWERPOINT®), the embedded animations will play. Save-As-MP3 or other animation relevant file formats are supported in word processing and spreadsheet applications such as WORD™ or EXCEL® available from Microsoft Corporation.

The 3D animations may work in all places on the 2D display canvas, including Headers, Footers, Grouped Elements, Slide Master, and the like. Alternatively, a poster frame image may be used. For example, the 3D animations may play in all modes except the following, in which the Poster Frame will be used:

Print Preview;
Page Layout and Page Break view;
Outline View and Draft View in word processing applications;
Notes Page View in slide presentation applications; and
Presenter View in slide presentation applications.

In sample embodiments, the animations may play in Protected View, Read-Only and Web Layout view in word processing applications.

In sample embodiments, when playing embedded animations in productivity application editors, if 2D effects are applied, these will be removed when the animation is playing, but will reappear when the animation is paused. This behavior is similar to 3D rotate. If a 2D slideshow animation which cannot be aggregated with 3D embedded animations (e.g., Fill Effect) is applied while a 3D embedded animation is loaded, then similar to 3D slideshow animations, these will be ignored, and the 3D embedded animation will take precedence.

Word Processing and Spreadsheet Applications

Figure 5A:
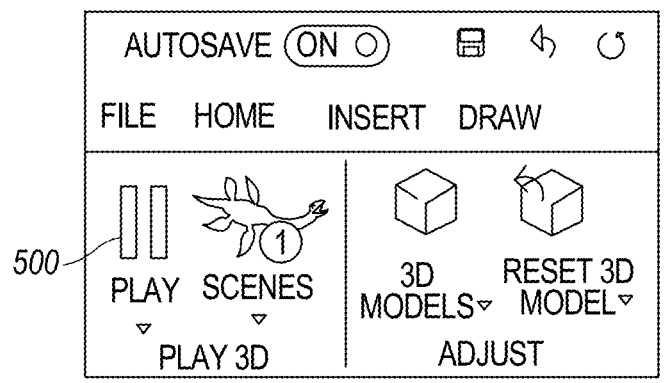
FIG. 5A illustrates the split button icon as a Pause button when the 3D model is animating in a sample UI.
Figure 5B:
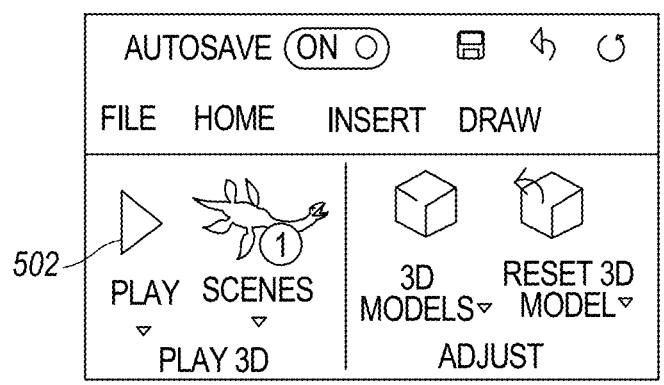
FIG. 5B illustrates the split button icon as a Play button when the 3D model is static and not animating in a sample UI.

Like video and slide presentation software animations, if the 3D model is animating, then the split button icon is a Pause button 500, as shown in FIG. 5A, and if static, the split button icon toggles to a Play button 502, as shown in FIG. 5B. When Pause button 500 is clicked, the 3D animation model 300 pauses at its current frame. This paused frame is transitionary only (like video) and should not persist between sessions or copy-paste. On the other hand, when the Play button 502 is clicked, the 3D animation model 300 continues animating from where it left off. These buttons' icons and commands are the same as conventional hover Play/Pause buttons. However, here the model(s) is selected, and when clicking these buttons, the model(s) should remain selected. The space-bar may also be tied to these commands during selection so the user can quickly play/pause.

Figure 6:
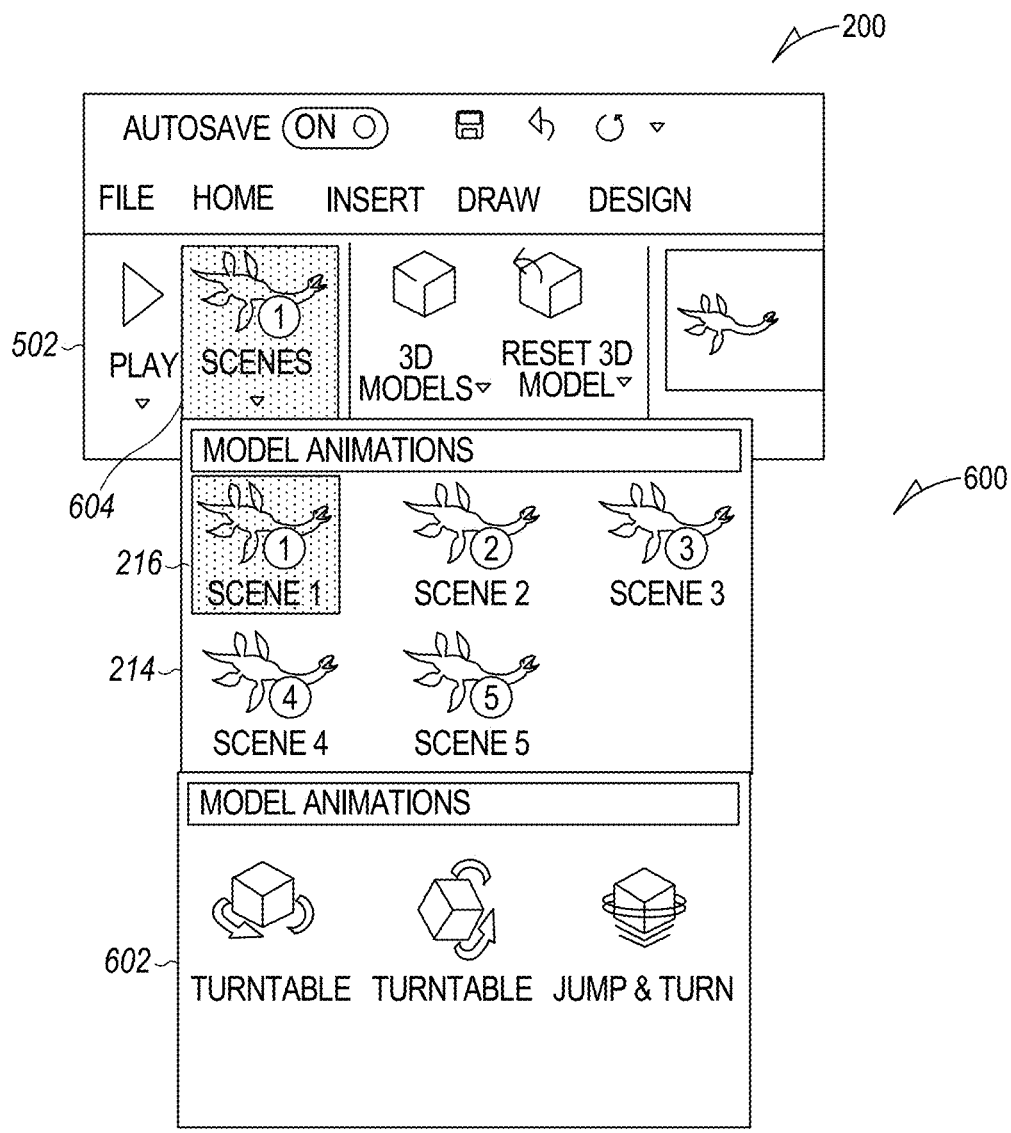
FIG. 6 illustrates a sample UI having a scenes gallery of 3D animated models including embedded animations and preset animations.

In some embodiments, the 3D animated models may include embedded animations and preset animations. In such cases, the Play 3D scenes gallery UI 600 may appear as shown in FIG. 6. As illustrated, the preset animations 602 such as Turntable and Jump & Turn are available along with the gallery scenes 214 for selection. The preset transform animations may be applied on top of any 3D model so that any model can be animated on the 2D display canvas.

Animated 3D models typically have a default animation as the animation is the core point of the content. However, non-animated models do not necessarily have a default animation, as the preset animations are a powerful tool only rather than the core point of the media. If embedded 3D animations exist, the insert default animation will continue to be the first embedded animation in the file. However, if no embedded 3D animations exist, then the insert default is null. This means to animate the 3D model in the 2D display canvas, the user will actively apply an animation, similar to presentation software animations for non-animated objects. When the default animation is null, the Play 3D split button 502 is disabled. When applying a preset animation when no animation was previously applied, the Play 3D split button 502 becomes enabled, and the Play 3D defaults may be as follows:

Repeat=1
AutoPlay=true

When hovering over the preset animations in the gallery 500, the model will live preview only that animation in the 2D display canvas so the user can easily explore. If the user hovers for long enough, it will play once then stop rather than continuously, as the default Repeat value is 1.

For non-animated models, the Play 3D gallery scenes ribbon icon 604 may be a generic yellow cube when no animation is applied or the icon for a preset animation 602 when a preset animation 602 is applied. If an embedded and preset animation are stacked, then the embedded animation may show in the ribbon-gallery 604, rather than the preset animation.

Slide Presentation Software Applications

Figure 7:
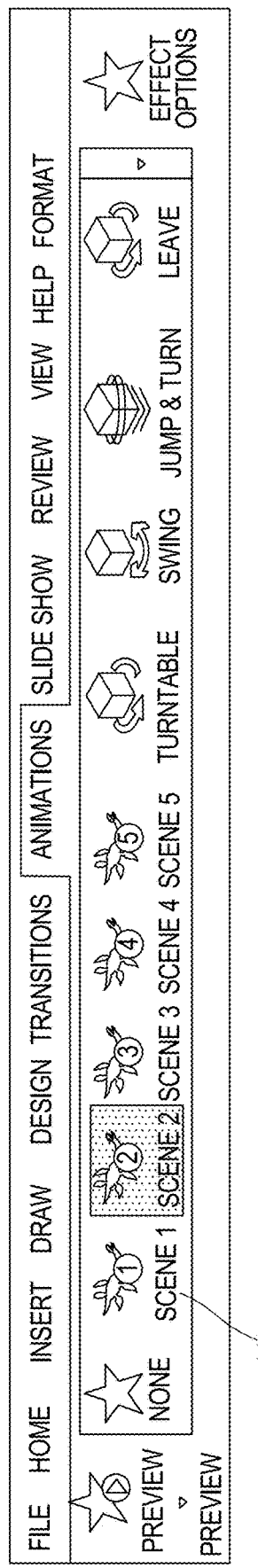
FIG. 7 illustrates a sample UI of slide presentation software including embedded animations in addition to the preset animations.
Figure 8:
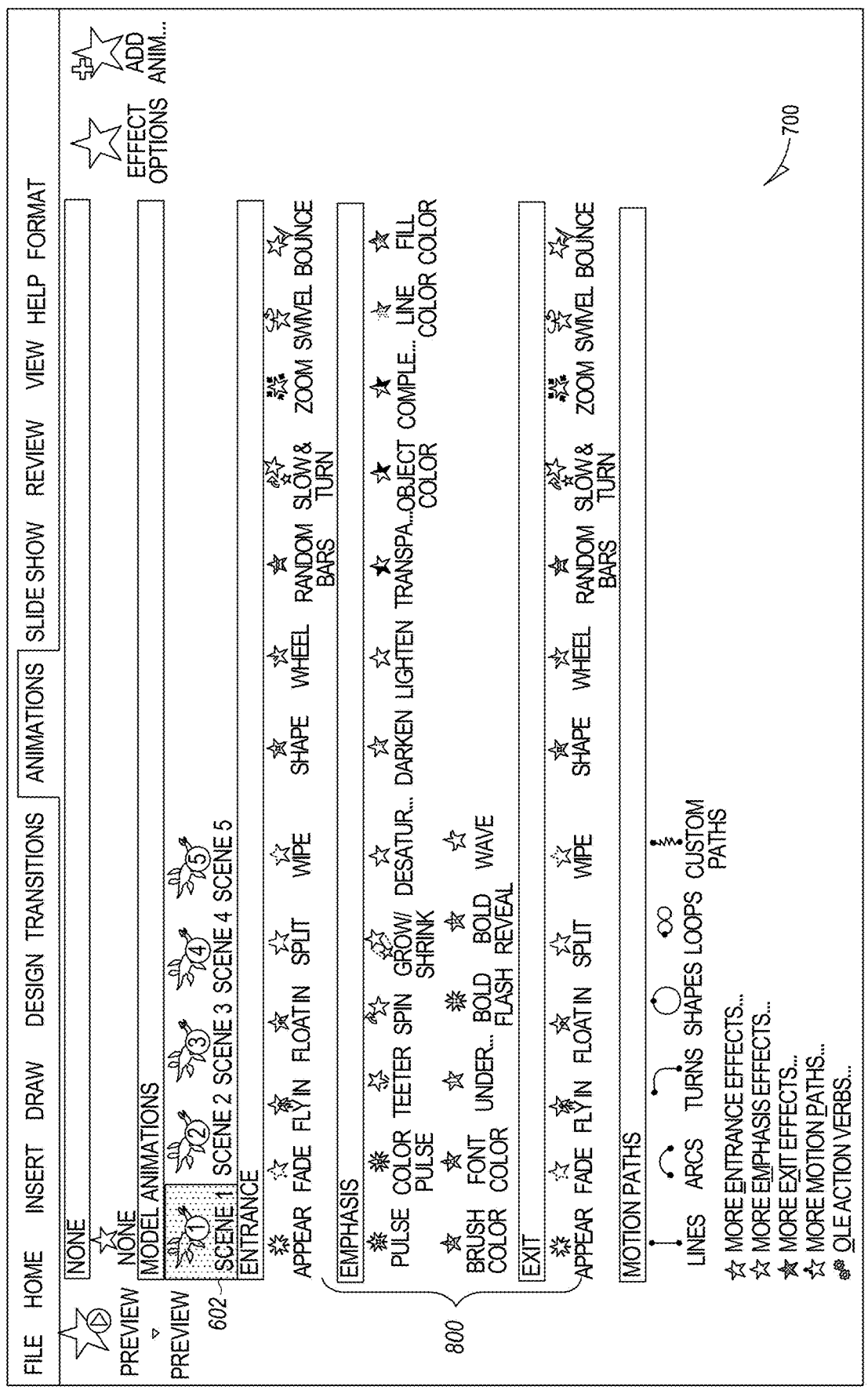
FIG. 8 illustrates the sample UI of FIG. 7 with the scenes gallery opened.

When adding embedded animation to the preset animations available in slide presentation software, the animations gallery may be extended to include the embedded animations. When one animated 3D model is selected, the embedded 3D animations may show in a new section 702 on the top of the UI 700 as illustrated in FIG. 7. When the scenes gallery is opened, the UI 700 may present conventional presentation options 800 as illustrated for POWERPOINT® in FIG. 8.

If two embedded animations are stacked on top of one another in a slide presentation application, the top embedded animation may play while the others are ignored. However, as with word processing and spreadsheet applications discussed above, an embedded animation may be aggregated with other 3D slideshow preset animations (e.g., Turntable, Jump & Turn, etc.), and these will be stackable.

To retain conventional presentation effects while animating (e.g., Line, Fill, Shadow, etc.), the presentation effects need to be applied to each frame. This is rendered on a different thread, and applying this would cause a performance degradation. To avoid a performance degradation, any 2D effects may be removed before animation and reapplied when the animation is finished. If any 2D slideshow animation that utilizes these 2D effects are stacked with an embedded animation, the embedded animation should take precedence and the 2D effect ignored, even if the 2D effect is higher in the animation order list.

Since animations are at the forefront of the animated 3D models content experience, the slide presentation software may be modified so that users may get started with animated models with a minimal number of clicks. Like video, on insert, a play animation may automatically be loaded into the slideshow reel of the slide presentation software.

Play 3D controls playback in the editor of the slide presentation software, and slideshow animations control playback in slideshow mode. To ensure that what the user sees in the editor is what the user gets in the slideshow, the settings may be shared. This means animations commands will need to fire changes in both preset animations and embedded animations, and the commands will need to fire changes in both embedded and preset animations.

If there are multiple embedded animations (e.g., if sequencing animations), then Play 3D will integrate with the first play animation only. If all embedded animations are deleted, then Play 3D plays independently in the editor while nothing plays in slideshow. If the user would like the 3D animation model to animate again in slideshow, then the user will need to re-add the play animation which will automatically inherit all the Play 3D settings, like on insert.

If the user clicks Reset 3D Model in the 3D Model format tab, the slideshow will also be adjusted to the insert defaults. This means if the user has accidently removed the embedded slideshow animation, the user can easily get back to where the animated model plays in slideshow.

Other Features

Figure 9:
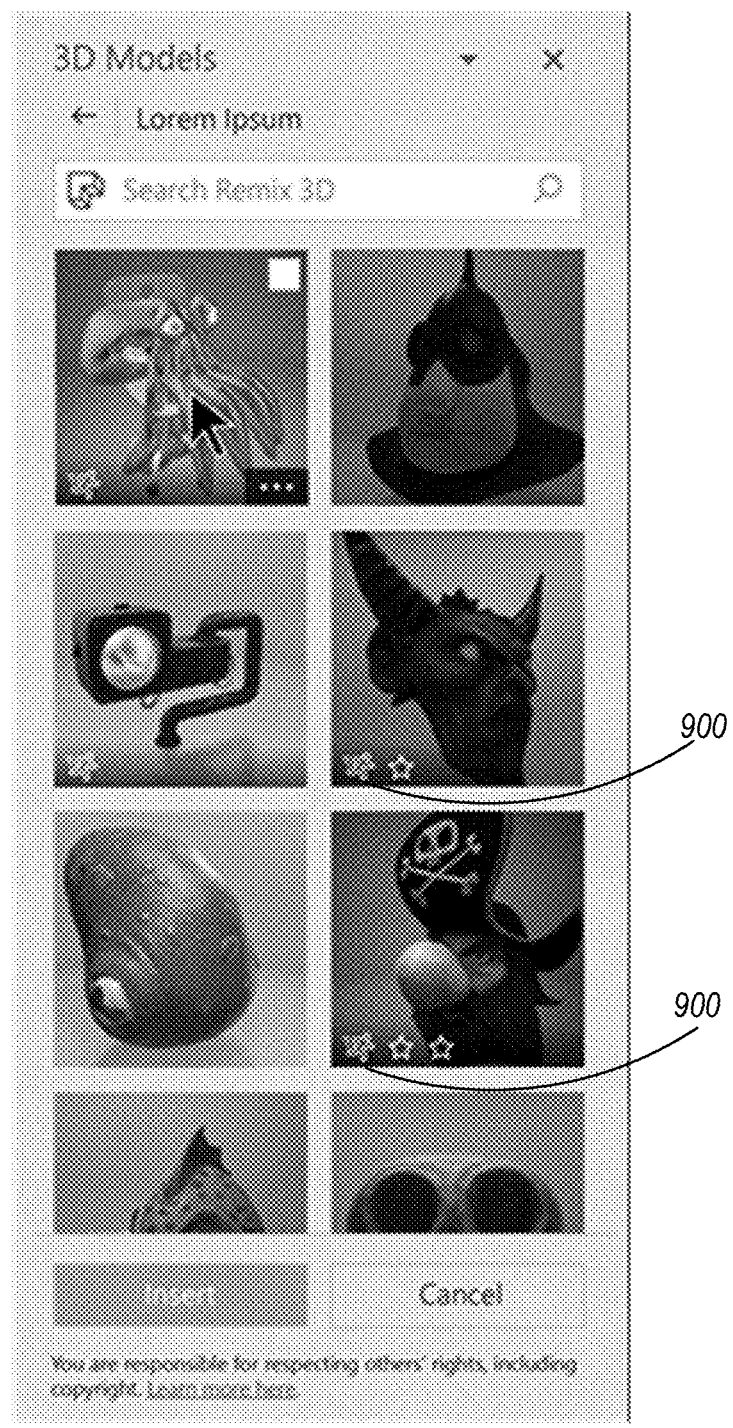
FIG. 9 illustrates use of a running man icon to badge animated content to distinguish the 3D animated content from static 3D content in a sample UI.

Since animated models in a library of 3D models may come in two varieties: static models and animated models, the animated models are badged to differentiate them from static models so that users know which models are animated. In sample embodiments, a Boolean animation parameter may be used to discern animated content. In other embodiments, a running man icon or some other designated icon 900 may be used to badge animated content, as shown in FIG. 9.

In sample embodiments, embedded 3D animations are preserved in transcoders and the animation steps are not stripped from the 3D animation files. Some application software only supports skeletal and transform embedded animations; however, other application software may support all other types of embedded animations in the glTF specification, including mode/path and morph animations that create the appearance of movement between slides in a presentation. This means on insert, the animation steps that are not supported will be stripped on transcode/engine load, and on file open, any animations steps that are not supported will not be loaded. If all the animations steps are not supported in a given animation, then that animation as a whole will not load. To manage this, the application software may be modified to query in the scene graph for each animation what animation types were encountered and which were loaded or ignored. The application software may also post imported metadata if any animation information was removed by the transcoders. Also, when opening a file in an unsupported version or platform, the animation information may be designed to always round trip as the model will lock and the animation is never re-serialized.

If the animation name does not resolve, playback will still work as the animation sequence is stored in file, not just the animation name. However, in the Play 3D gallery, for the thumbnail a generic yellow cube icon with string 'Custom' may be used in place of the animation icon and string. If there are animation steps that are not recognized, the application software may simply skip the steps that it does not recognize and play the steps it does recognize.

In sample embodiments, in order to minimize unnecessary computing power and battery, ambient and continuous animations may be paused without user notification when the application is minimized. When the animation is unminimized, the animations may re-commence where they left off.

The animations may continue to play throughout idle time, as these use cases should be controlled through the operating system. For example, the computer may be playing continuously as a kiosk with the battery plugged in and stopping the animation after a given time will be against the use case. The animations will only pause when the operating system goes to sleep or is in screen-saver mode.

In sample embodiments, for those with epilepsy and sensitivity to sudden movements, the application software may include settings to turn off the animations. For example, the settings may prevent the 3D animations from starting automatically. When such a setting has been set, the user would need to engage with the 3D animations by actively clicking to preview animations. Also, the animations would not automatically play when inserting a 3D model.

The subject matter defined in the appended claims is not necessarily limited to the benefits described herein. A particular embodiment may provide all, some, or none of the benefits described herein. Although operations for the various techniques are described herein in a particular sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

System Configuration

Techniques described herein may be used with one or more of the computer systems described herein and/or with one or more other systems. For example, the various procedures described herein may be implemented with hardware or software, or a combination of both. For example, the processor, memory, storage, output device(s), input device(s), and/or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 10:
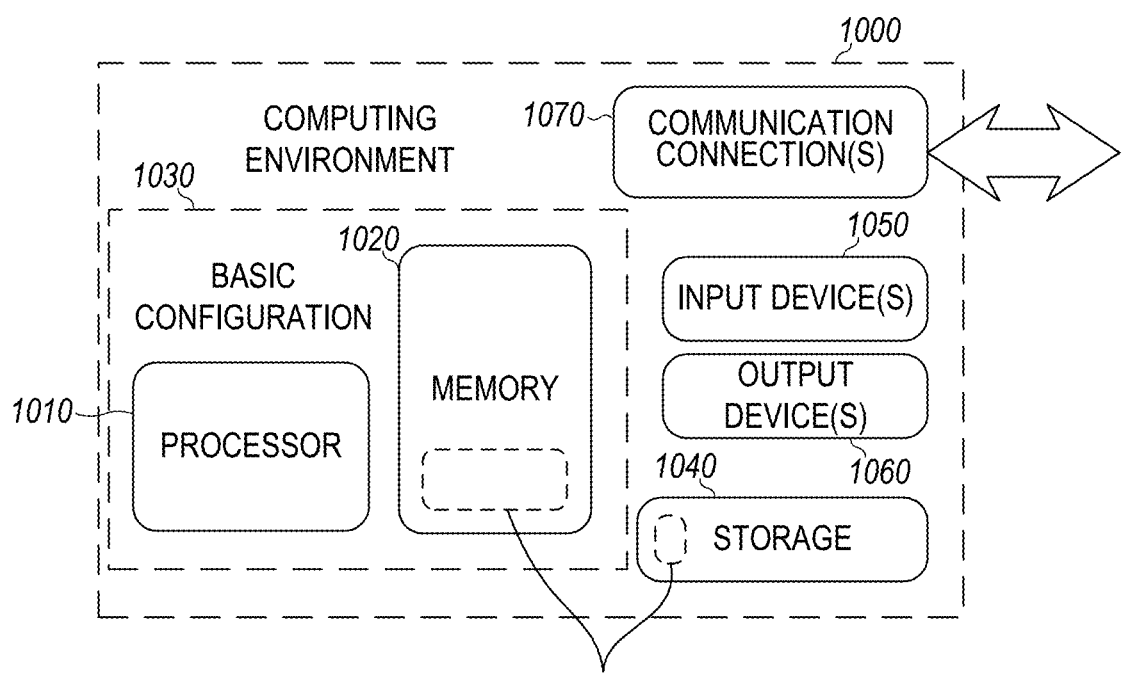
FIG. 10 is a block diagram illustrating a generalized example of a suitable computing environment in which one or more of the described aspects of the sample embodiments may be implemented.

FIG. 10 illustrates a generalized example of a suitable computing environment 1000 in which one or more of the described aspects may be implemented. For example, one or more such computing environments can be used as a client computer device and/or a server computer system. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like. The computing environment 1000 is not intended to suggest any limitation as to scope of use or functionality, as the systems and methods described herein may be implemented in diverse types of computing environments.

Various illustrated hardware-based computer components are illustrated in FIG. 10. As will be discussed, these hardware components may store and/or execute software. The computing environment 1000 includes at least one processing unit or processor 1010 and memory 1020. In FIG. 10, this most basic configuration 1030 is included within a dashed line. The processing unit 1010 executes computer-executable instructions and may be a real or a virtual processor. In a multi-processing system, multiple processing units execute computer-executable instructions to increase processing power. The memory 1020 may be volatile memory (e.g., registers, cache, RAM), non-volatile memory (e.g., ROM, EEPROM, flash memory), or some combination of the two. The memory 1020 stores software 1080 implementing three-dimensional embedded and/or static animation models in a two-dimensional canvas as described herein. An implementation of three-dimensional embedded and/or static animation models in a two-dimensional canvas may involve all or part of the activities of the processor 1010 and memory 1020 being embodied in hardware logic as an alternative to or in addition to the software 1080.

Although the various blocks of FIG. 10 are shown with lines for the sake of clarity, in reality, delineating various components is not so clear and, metaphorically, the lines of FIG. 10 and the other figures discussed below would more accurately be grey and blurred. For example, one may consider a presentation component such as a display device to be an I/O component (e.g., if the display device includes a touch screen). Also, processors have memory. Thus, the diagram of FIG. 10 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 10 in reference to "computer," "computing environment," or "computing device."

Computing environment 1000 may have additional features. In FIG. 10, the computing environment 1000 includes storage 1040, one or more input devices 1050, one or more output devices 1060, and one or more communication connection devices 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The memory 1020 can include storage 1040 (though they are depicted separately in FIG. 10 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment 1000. The storage 1040 stores instructions for the software 1080.

The input device(s) 1050 may be one or more of various different input devices. For example, the input device(s) 1050 may include a user input device such as a mouse, keyboard, trackball, etc. The input device(s) 1050 may implement one or more natural user interface techniques, such as speech recognition, touch and stylus recognition, recognition of gestures in contact with the input device(s) 1050 and adjacent to the input device(s) 1050, recognition of air gestures, head and eye tracking, voice and speech recognition, sensing user brain activity (e.g., using EEG and related methods), and machine intelligence (e.g., using machine intelligence to understand user intentions and goals). As other examples, the input device(s) 1050 may include a scanning device, a network adapter, a CD/DVD reader, or another device that provides input to the computing environment 1000. The output device(s) 1060 may be a display, printer, speaker, CD/DVD-writer, network adapter, or another device that provides output from the computing environment 1000. The input device(s) 1050 and output device(s) 1060 may be incorporated in a single system or device, such as a touch screen or a virtual reality system.

The communication connection(s) 1070 enables communication over a communication medium to another computing entity. Additionally, functionality of the components of the computing environment 1000 may be implemented in a single computing machine or in multiple computing machines that are able to communicate over communication connections. Thus, the computing environment 1000 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment 1000, computer-readable storage media include memory 1020, storage 1040, and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level descriptions for operations performed by a computer and should not be confused with acts performed by a human being, unless performance of an act by a human being (such as a "user") is explicitly noted. The actual computer operations corresponding to these terms vary depending on the implementation.

Figure 11:
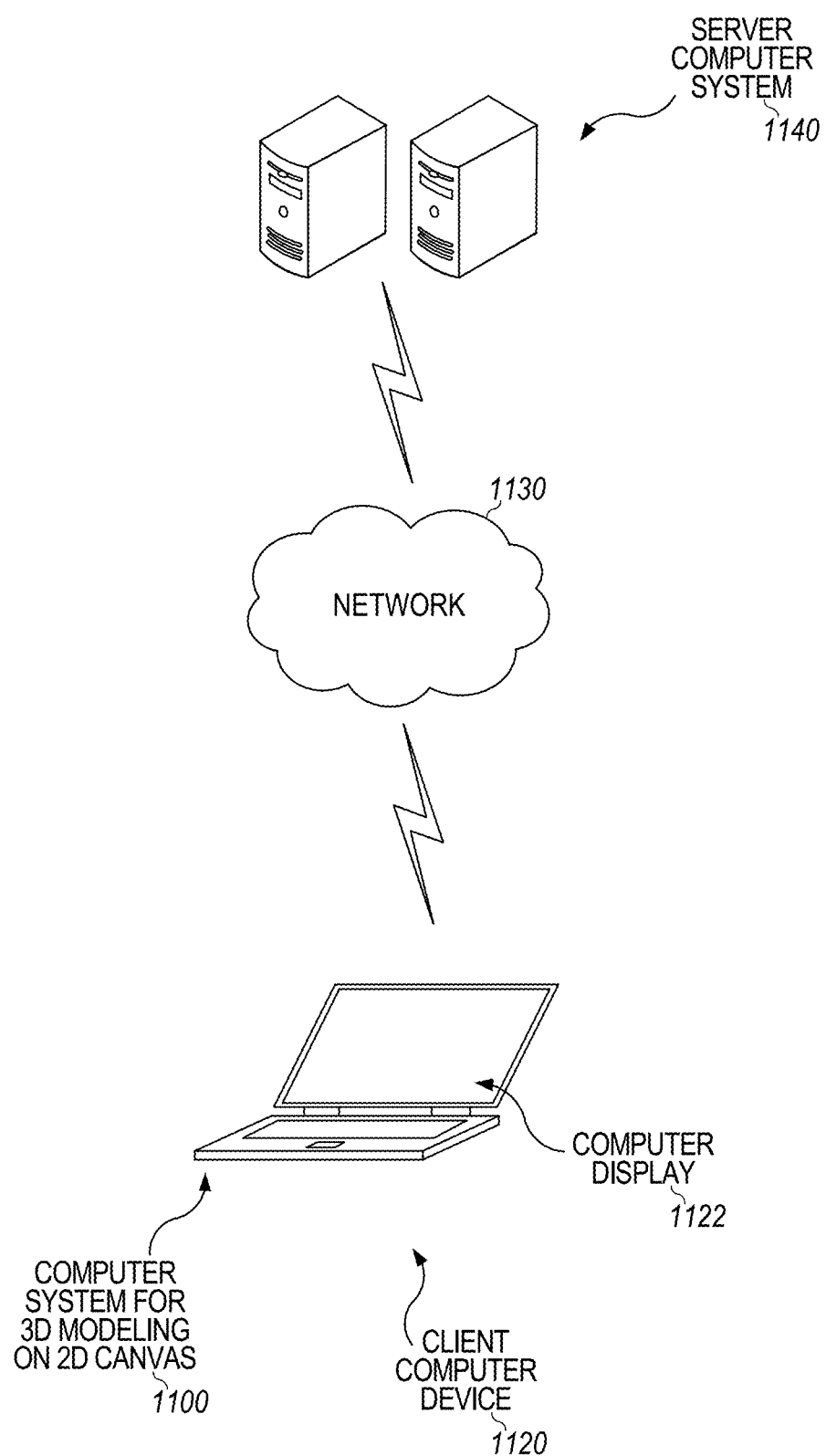
FIG. 11 is a schematic diagram of a system for 3D modeling in a two-dimensional canvas, in conjunction with which one or more of the described aspects of the sample embodiments may be implemented.

FIG. 11 is a schematic diagram of a system 1100 for 3D modeling in a two-dimensional canvas, in conjunction with which one or more of the described aspects may be implemented. In referencing FIG. 11, it will be appreciated that communications between the various devices and components discussed herein can be sent using computer system hardware, such as hardware within a single computing device, hardware in multiple computing devices, and/or computer network hardware. In FIG. 11, each of the components includes hardware, and may also include software. For example, a component of FIG. 11 may be implemented entirely in computer hardware, such as in a system on a chip configuration. Alternatively, a component may be implemented in computer hardware that is configured according to computer software and runs the computer software. The components may be distributed across computing machines or grouped into a single computing machine in various different ways. For example, a single component may be distributed across multiple different computing machines (e.g., with some of the operations of the component being performed in one or more client computing devices and other operations of the component being performed in one or more machines of a server).

The computer system 1100 of FIG. 11 may include a client computer device 1120 that may include a computer display 1122. The client computer device 1120 may communicate over a computer network 1130 with a server computer system 1140. The tools and techniques discussed herein can be distributed in any of many different ways between one or more client computer devices 1120 and/or server computer systems 1140. Indeed, the tools and techniques may be implemented in a stand-alone computer device, such as a client computer device 1120 that is not currently connected to a computer network 1130. As another example, a computer application that is performing techniques discussed herein may be a Web application that is running in a server computer system 1140 utilizing a browser application on a client computer system. As another example, such an application may be distributed between components running in a client computer device 1120 and a server computer system 1140.

Figure 12:
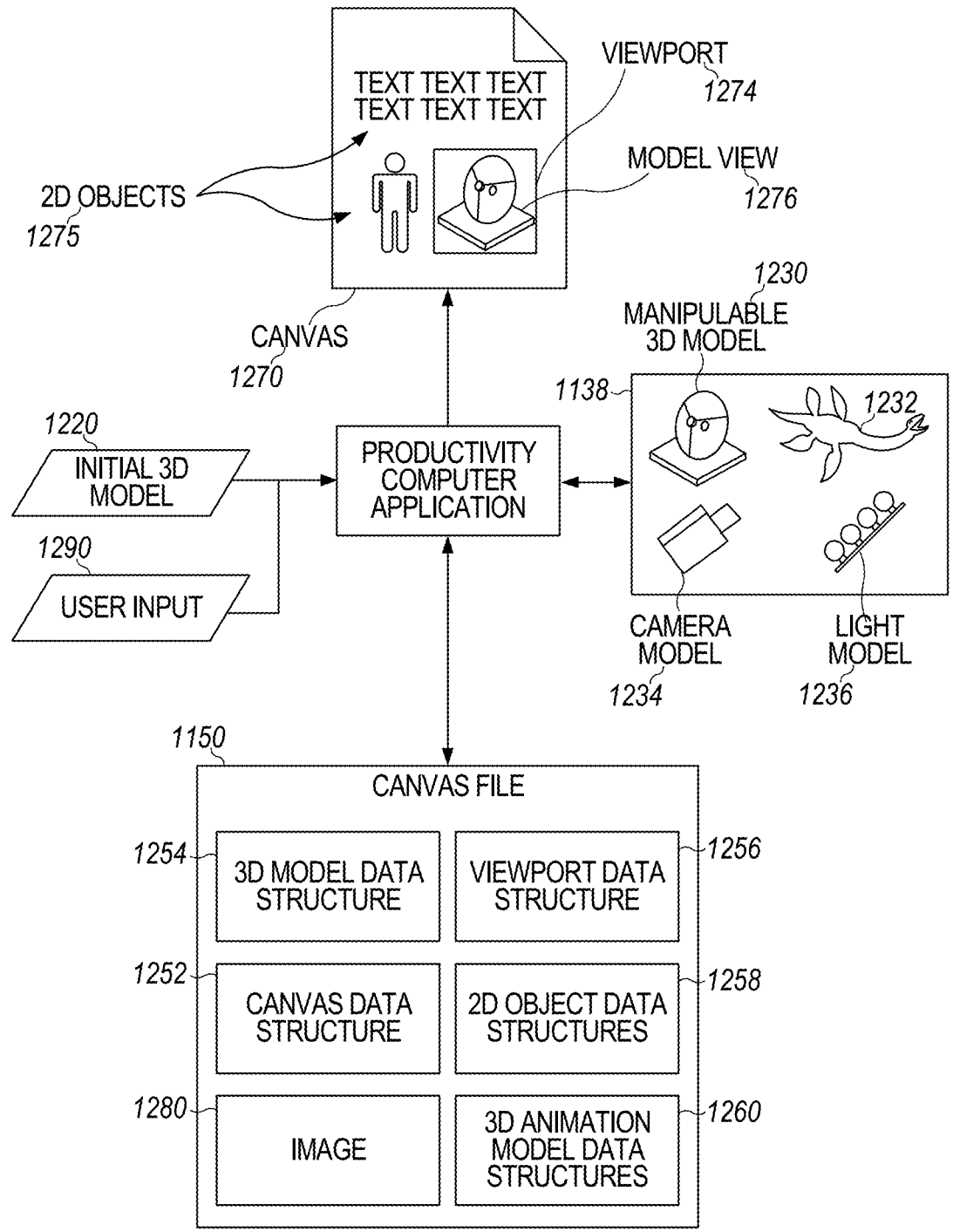
FIG. 12 is a block diagram illustrating a computer system that can run a productivity computer application for implementing 3D animation models in sample embodiments.

FIG. 12 illustrates a computer system that can run a productivity computer application, such as a word processing application, a spreadsheet application, a slide presentation application, an email application, and/or a note-taking application in sample embodiments. Alternatively, some other type of application that utilizes two-dimensional canvases may be used. Indeed, some tools and techniques discussed herein may be useful in a three-dimensional canvas that does not involve a two-dimensional canvas.

The productivity application 1210 illustrated in FIG. 12 can generate or receive an initial three-dimensional model 1220. For example, the initial model 1220 may be generated from scratch in response to user input 1290 in the productivity computer application. As another example, the initial model 1220 may be one of a number of available three-dimensional model templates generated specifically for use with the productivity computer application 1210. As another example, the initial 3D model 1220 may be received by the productivity computer application 1210 in one format and may be converted to another format by the productivity computer application 1210 to allow for manipulation with the productivity computer application 1210. For example, the productivity computer application 1210 may be programmed to convert any of a number of different three-dimensional file formats (e.g., .OBJ, .FBX, .PLY, .3MF, .STL, or .GLB formats) into a single format that is used by the productivity computer application 1210 to present and manipulate three-dimensional models 1230 and three-dimensional animation models 1232. To perform the conversion, the productivity computer application 1210 may invoke some other computer component to perform some or all of the conversion, such as utilizing an existing application programming interface. Accordingly, manipulable three-dimensional models 1230 and three-dimensional animation models 1232 may be in the same format as when received by the productivity computer application 1210, or they may be in a converted format. In one example, the productivity computer application 1210 may receive an initial three-dimensional model 1220 from a remote server computer system and may or may not convert that initial three-dimensional model 1220 to produce the manipulable three-dimensional model 1230 or three-dimensional animation model 1232.

The productivity computer application 1210 can include the manipulable three-dimensional model 1230 or three-dimensional animation model 1232 in a three-dimensional scene 1238, which is a model of an actual three-dimensional scene, and can include the manipulable three-dimensional model 1230 and/or the three-dimensional amination model 1232, a camera model 1234 (sometimes referred to as a virtual camera or simply as a camera) that defines properties of a model of a camera through which the manipulable three-dimensional model is viewed in the three-dimensional scene 1238, and a light model 1236, which defines modeled lighting properties for the three-dimensional scene 1238. For example, the three-dimensional scene 1238 can include relative positions for the manipulable three-dimensional model 1230 and/or the three-dimensional animation model 1232, the camera model 1234, and one or more light sources for the light model 1236. The three-dimensional scene 1238 can also include other properties, such as field of view for the camera model 1234, and additional lighting properties for the light model 1236. As used herein, manipulation of the three-dimensional model 1230 can refer to manipulation of properties of the three-dimensional scene 1238 used to display the manipulable three-dimensional model 1230 and/or the three-dimensional animation model 1232, such as sideways and up-down translation of the camera model 1234 for panning, changing the field of view of the camera model 1234 for zooming, and/or rotating the manipulable three-dimensional model 1230 and/or three-dimensional animation model 1232 to a different position. Other manipulations to the three-dimensional scene 1238 may be used in addition to or in place of these manipulations, such as translating the manipulable three-dimensional model 1230 or three-dimensional animation model 1232 for panning, moving the camera model 1234 for zooming operations, and/or rotating the camera model 1234 around the manipulable three-dimensional model 1230 or three-dimensional animation model 1232 for rotation of the manipulable three-dimensional model 1230 or three-dimensional animation model 1232. When referring herein to manipulating a three-dimensional model, any such types of manipulations may be contemplated, whether directly manipulating the three-dimensional model itself, or manipulating the view of the three-dimensional model by manipulating other components in the three-dimensional scene.

The productivity computer application 1210 may maintain an image file 1280 and a canvas file 1250, such as a word processing file, a spreadsheet file, or some other type of canvas file for displaying images, text, three-dimensional objects, three-dimensional animations, and the like. As an example, the canvas file 1250 may include a canvas data structure 1252 that defines a canvas 1270 (such as a page of a word processing document), a three-dimensional model data structure 1254 that defines the three-dimensional scene 1238 including the manipulable three-dimensional model 1230 and/or three-dimensional animation model 1232, a viewport data structure 1256 that defines a viewport 1274 for viewing the manipulable three-dimensional model 1230 or three-dimensional animation model 1232 according to properties of the three-dimensional scene 1238 in a model view 1276 the three-dimensional model data structure 1254, two-dimensional object data structures 1258 that define properties of other two-dimensional objects 1275 (visual objects) in the two-dimensional canvas 1270, and three-dimensional animation model data structures 1260 that define the properties of the three-dimensional animation model data structures used in the three-dimensional animation model 1232 presented in the model view 1276 of the viewport 1274 in accordance with the techniques described herein.

The productivity computer application 1210 may transform 3D animation model 1232 as described in detail above. On the other hand, the productivity computer application 1210 may transform the manipulable three-dimensional model 1230 in one of various ways, such as transforming the three-dimensional model 1230 into a polygon model. Operations can be performed for translating and/or rotating the manipulable three-dimensional model 1230 or manipulating the three-dimensional animation model 1232 as described above. For example, rotation of the three-dimensional model 1230 or three-dimensional animation model 1232 may include the productivity computer application 1210 performing three-dimensional matrix transformations and quaternion rotations.

The manipulable three-dimensional model 1230 can be represented as many triangles in three-dimensional canvas. The productivity computer application 1210 can transform vertices of the triangles into corresponding points in a two-dimensional plane for rendering and can account for perspectives of the view as defined by the three-dimensional scene 1238 in performing these operations (such as the camera position and field of view of the camera model 1234). For example, this may include performing matrix operations and/or quaternion operations. The productivity computer application 1210 may also apply clipping operations to clip portions of the image outside the viewing area, such as outside the viewport 1274. Additionally, the productivity computer application 1210 may perform operations such as rendering conversion operations to fill in portions of the resulting three-dimensional model view 1276. This can include calculating which pixels to render, which can include determining which pixels are blocked by other pixels in the three-dimensional model view 1276. Additionally, the pixels' color, texture, and shading can be calculated using color, texture, and lighting properties from the three-dimensional scene 1238. Different rendering and/or modeling techniques from those discussed herein may be used.

The productivity computer application 1210 may include the resulting two-dimensional model view 1276 of the three-dimensional model 1230 in the viewport 1274 in the canvas 1270 on a computer display. Also, the productivity computer application 1210 may generate a digital image 1280 (which may be in an image file format, such as a .png (portable network graphics) file) using the pixel properties from the rendering of the manipulable three-dimensional model 1230 or from the three-dimensional model 1232 as described above. The image 1280 may be utilized by the productivity computer application 1210 and may be stored as part of the canvas file 1250 (which may include storing the image within the canvas file 1250 itself or including a reference to the image 1280 in the canvas file 1250).

The 3D model manipulation and rendering operations can be performed directly by the productivity computer application 1210 using hardware in the computer system. However, as with other operations discussed herein, some or all of the operations may be performed by the productivity computer application 1210 invoking other local or remote computer components to perform the operations. For example, the productivity computer application 1210 may make application programming interface calls or other requests to local and/or remote applications to perform operations such as manipulation operations on the manipulable three-dimensional model 1230 and three-dimensional animation model 1232 and/or rendering operations to produce the two-dimensional model view 1276 of the three-dimensional model 1230.

The productivity computer application 1210 can respond to continuous user input 1290 by performing continuous real-time rotation and other manipulations of the three-dimensional model 1230 and/or three-dimensional animation model 1232 through the viewport in the two-dimensional canvas 1270. In other words, real-time results of such manipulations can be displayed in the viewport 1274 in real time in response to the user input 1290. The user input may be directed at the viewport 1274 as well, such as by providing touch input or cursor input directed at the viewport 1274. As examples, such manipulations may include rotating, panning, and/or zooming.

The bounds of the viewport 1274 can be trimmed to fit the determined location of the 3D model 1230 and/or 3D animation model 1232, possibly with a predetermined boundary around the model (such as a predetermined number of pixels outside the model being included in the viewport 1274). The viewport 1274 may be shaped to the contours of the model, or it may be some other shape such as a rectangular shape. However, performance may be enhanced by approximating the extents of the model view 1276 using bounding boxes. Bounding boxes are often generated for basic components of three-dimensional models in existing modeling and rendering techniques and can be retrieved from existing application programming interfaces. For example, each bounding box may be a cube, or possibly some other basic shape, which contains a sub-part of a three-dimensional model. The positions of the points of those bounding boxes, projected into two-dimensional canvas through a rendering process using the three-dimensional scene for the model can be used to estimate the extents of the model view 1276. Using such bounding boxes will typically yield a size for the viewport 1274 that is larger than the model view 1276, because the bounding boxes contain the model sub-parts, but may extend beyond the sub-parts they contain. This can provide for a natural margin around the model view 1276 in the viewport 1274. Also, by using the bounding boxes for computing the extents of the model view 1276, rather than using the points of the model itself (such as triangles representing the model in a rendering process), computational resources can be conserved because the bounding boxes typically include fewer points to be analyzed than the representation of the model itself. Some manipulations can be performed in a non-autofit mode. In that mode, the size of the viewport 1274 is not automatically updated to fit the model view 1276 as manipulations are performed to the three-dimensional model in response to user input.

The computer system 1000 can switch between the autofit mode and the non-autofit mode in response to direct user input, such as user input making a selection in a menu or dialog box displayed for a computer application. Additionally, the computer system 1000 may automatically switch between modes in some situations. For example, if user input 1290 indicates that the 3D model 1230 or 3D animated model 1232 is to be panned or zoomed while in autofit mode, the computer system 1000 may automatically switch to a non-autofit mode. As another example, if the computer system 1000 is in non-autofit mode and user input selects one of the view presets discussed herein, the computer system 1000 may display the corresponding preset view and switch to autofit mode.

The three-dimensional models and three-dimensional animation models described herein may be provided to a two-dimensional canvas in a computing environment as a computer-implemented method. For example, each technique may be performed in a computer system 1000 that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic. The different tools and techniques discussed below can be used in any combination with each other. Also, each of the advantageous tools and techniques discussed above can be used with each other in any combination thereof. Additionally, some techniques may omit some of the basic acts and/or features of the basic techniques illustrated in FIG. 13 and FIG. 14 and/or other acts of different techniques discussed herein.

Figure 13:
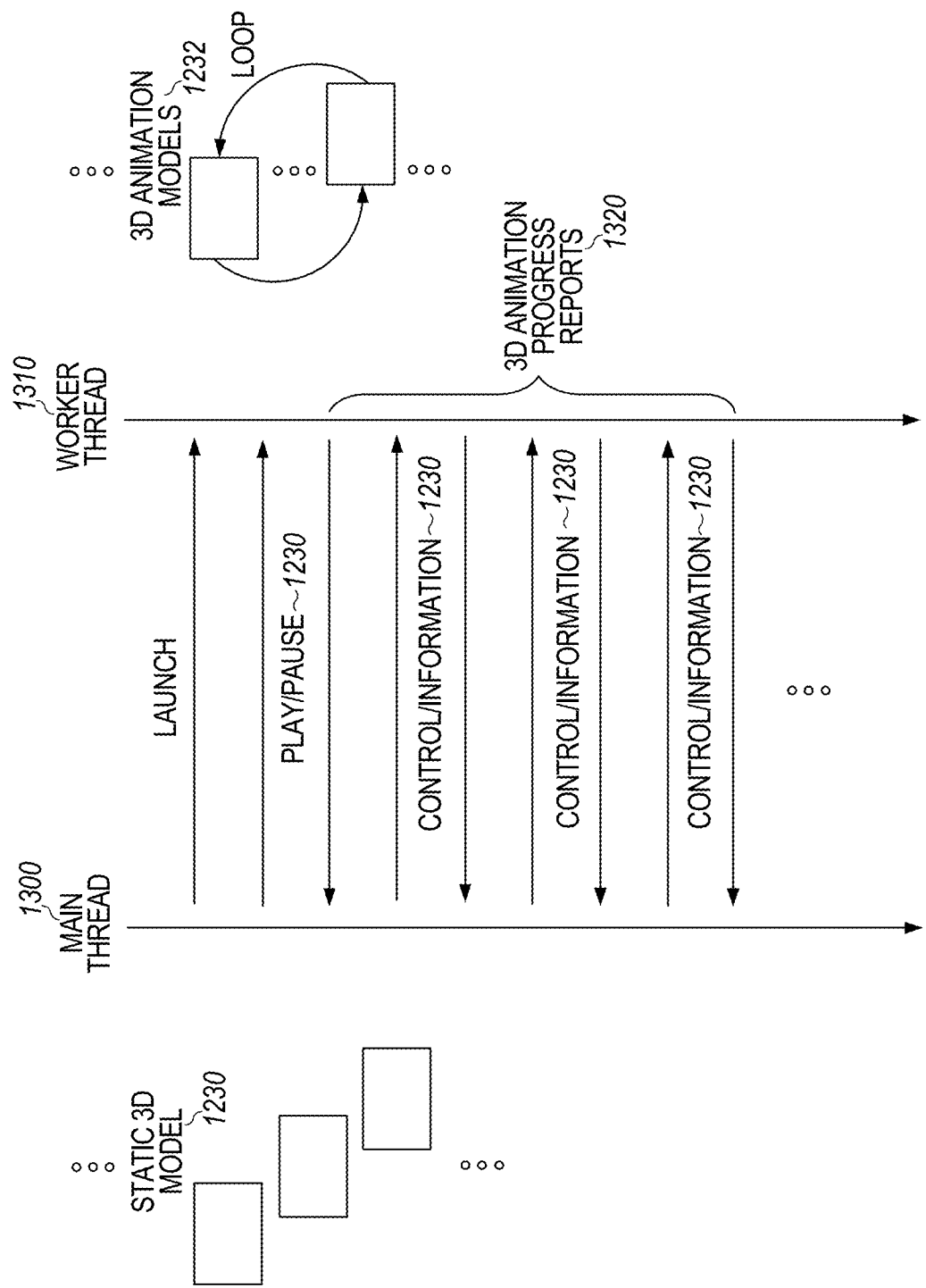
FIG. 13 is a process flow diagram illustrating the use of a main thread including instructions for executing the processes and features of a productivity computer application including rendering of static 3D models and a worker thread that continuously passes animation progress data to the main thread while the 3D editing is occurring.

As noted above, since animated 3D models cannot render on the main thread of a productivity computer application 1210 as it would interfere with the user's ability to interact with and edit other content in the document, a new worker thread is created that runs concurrently with the main thread to render the animated 3D content ambiently in the background while the main thread separately responds to user input to manage the static (non-animated) content. For example, as illustrated in FIG. 13, the main thread 1300 includes instructions for executing the processes and features of the productivity computer application 1210 including rendering of static 3D models 1230. In a sample embodiment, the worker thread 1310 is initiated to render the 3D animated models 1232 described herein ambiently while the main thread 1300 separately executes the other instructions of the productivity computer application 1210 including managing static 3D content.

Animation structures of 3D models may be expressed in the canvas file 1250 by inserting the 3D animation and it playback parameters into the 3D scene 1238. This is done through the 3D animation model data structures 1260 added to the canvas file 1250. Since the 3D editing of the 3D model 1230 and 3D animation model 1232 is performed on the main thread 1300, to continue animating during 3D editing, the worker thread 1310 continuously passes animation progress data 1320 to the main thread 1300 while the 3D editing is occurring. The user may thus explore animations and play/pause in the document as the control information 1330 is passed from the main thread 1300 to the worker thread 1310 and progress reports 1320 are provided to the main thread 1300 by the worker thread 1310, which extends existing 3D animation concepts in productivity applications to include embedded 3D animations as well when displaying data to the 2D display canvas 1270.

In addition to multi-threading, means for playing and pausing the animated 3D model 1232 on the 2D display canvas 1270 under user control without interacting with the main thread 1300 includes non-blocking input/output and/or Unix signals adapted to provide similar results. No matter which means for playing and pausing the animated 3D model 1232 is used, the display software is designed to respect the z-order of the text layout options of surrounding content (including any animated content). As noted above, animation decisions may be made for the user by using a default model that plays a first animation in the 3D animation file and loops continuously as illustrated in FIG. 13.

As also noted above, if the animation is changed, the bounding box is fitted to the entire animation scene whereby all areas of the 3D animation model 1232 may traverse in the animation. In sample embodiments, the bounding box stays within proportional area in the document on the canvas 1270 so as not to disrupt surrounding media and text in the document, spreadsheet, or slide presentation. For example, if the first animation is a shark swimming in place, then a second animation may be the shark swimming across a large area. Rather than the bounding box suddenly filling the entire document when switching from the first animation to the second animation, the shark is shrunk to swim in an area contained to its relative canvas in the document. In other words, the bounding box in the viewport 1274 stays the same size. In this manner, the presentation to the 2D display canvas 1270 takes into account other surrounding content 1275.

Figure 14:
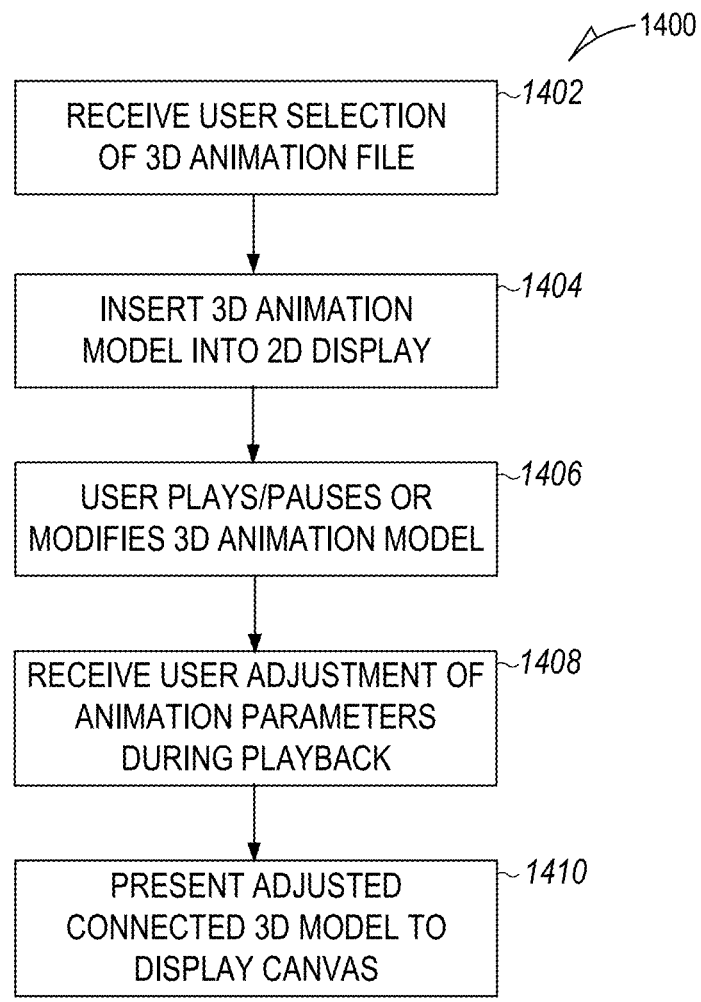
FIG. 14 illustrates a flow diagram of the process for presenting an animated 3D model with user adjusted animation parameters to a 2D display canvas on a display device of a computer in a sample embodiment.

FIG. 14 illustrates a flow diagram of the process for presenting an animated 3D model 1232 with user adjusted animation parameters to a 2D display canvas 1270 on a display device 1060 of a computer 1000 in a sample embodiment. The process illustrated in FIG. 14 may, for example, be processed on the hardware and functional components of an example computing system configuration such as that illustrated in FIG. 10 to implement operations for implementing a 3D animated model according to an example embodiment. The example operations described in FIG. 14 may, for example, be performed at or among a local (e.g., client) or remote (e.g., server) computing device, and distributed component examples of the same. In the example computing configuration of FIG. 10, a software application 1080 is adapted to execute exclusively on a single computing device (e.g., computing system 1000) with use of a processor 1010 and a memory device 1020, with operation of respective processes as discussed herein. In a further example, the software application 1080 is adapted to execute some of the processes on a local computing device (e.g., computing system 1000), with additional data and processing for a third-party skill being performed at a remote computing device.

As illustrated in FIG. 14, the process 1400 for presenting an animated 3D model 1232 with user adjusted animation parameters to a 2D display canvas 1270 on a display device 1060 of a computer 1000 in a sample embodiment includes the step of receiving at 1402, by one or more processors 1010 of the computing system 1000, user selection via the UIs described herein of a 3D animation file 1260 that contains animation parameters of a 3D model of a preset animation 1230 or an embedded customized animation 1232. The animated 3D model 1230 or 1232 is then inserted into the 2D display canvas 1270 at 1404 while preserving the animation parameters of the animated 3D model 1230 or 1232 in the 3D canvas data structure file 1252 during transcoding. The software application 1080 may then play and pause the animated 3D model 1230 or 1232 on the 2D display canvas 1270 at 1406 under user control independent of the main thread 1300 that enables interaction with and editing of other content 1275 besides the animated 3D model 1230 or 1232 on the 2D display canvas 1270. The user adjustment of animation parameters of the animated 3D model 1230 or 1232 during playback are received at 1408, and the animated 3D model with user adjusted animation parameters is presented at 1410 to the 2D display canvas 1270 on the display device 1060 of the computer 1000.

It will be understood, that although certain hardware and functional components are depicted in FIG. 10 and in other drawings as separate systems or services, the features of certain of the components may be integrated into a single service or subsystem. Further, although only one computing system is described, it will be understood that the features of the computing system 1000 described herein may be distributed in some settings among one or multiple computing systems (including in cloud-based processing settings). It will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center) than that in which the code is deployed (e.g., in a test computing environment). Similarly, operational data may be included within respective components or modules and may be embodied in any suitable form and organized within any suitable type of data structure. The operational data may be collected as a single data set or may be distributed over different locations including over different storage devices.

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

Accordingly, the phrase "hardware component" should be understood to encompass a tangible record, be that a record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Those skilled in the art will appreciate that the 3D animation system described herein provides many technical advantages over conventional 3D animation systems. For example, the 3D animation system described herein enables the playing of embedded animations as well as 3D preset animations in the editor of productivity applications. The animation platform also includes a user interface that enables users to pause an animation, edit a document while the animations are playing in the editor, change to 3D animation for a given model, set an animation to run ambiently in the background, adjust how many times the animation loops, toggle as to whether embedded animations will automatically play in the editor or not, sequence multiple embedded and preset 3D animations, copy-paste a 3D model, disable animations in the editor, and the like. Such 3D animation features will greatly enhance the productivity of users of productivity applications such as word processing applications, spreadsheet applications, slideshow presentation applications, email applications, and the like.

Certain embodiments are described herein as numbered examples 1, 2, 3, etc. These numbered examples are provided as examples only and do not limit the subject technology.

Example 1 is a computer-implemented method, comprising receiving, by one or more processors, user selection of a 3D file that contains animation parameters of an animated 3D model; inserting, by the one or more processors, the animated 3D model into a 2D display canvas while preserving the animation parameters of the animated 3D model described in the 3D file, wherein the 2D display canvas is associated with a main thread that enables interaction with and editing of other content besides the animated 3D model in the 2D display canvas; playing and pausing, by the one or more processors, the animated 3D model on the 2D display canvas under user control independent of the main thread; receiving, by the one or more processors, user adjustment of animation parameters of the animated 3D model during playback; and presenting, by the one or more processors, the animated 3D model with user adjusted animation parameters to the 2D display canvas on a display device.

Example 2 is a method as in Example 1 wherein the animated 3D model loops continuously during playback.

Example 3 is a method as in any preceding example wherein a default animation of the animated 3D model plays upon insertion or opening of the animated 3D model into the 2D display canvas.

Example 4 is a method as in any preceding example wherein a worker thread separate from the main thread plays and pauses the animated 3D model and wherein receiving user adjustment of animation parameters of the animated 3D model during playback comprises the worker thread passing animation progress data to the main thread during playback of the animated 3D model while the main thread receives user adjustment of the animation parameters of the 3D model.

Example 5 is a method as in any preceding example further comprising presenting respective frames of the animated 3D model on the 2D display canvas at different rotated positions of the animated 3D model for user selection, wherein the different rotated positions of the animated 3D model presented for selection represent the different respective rotated positions of the animated 3D model in respective playbacks of the animated 3D model.

Example 6 is a method as in any preceding example wherein the respective frames of the animated model are presented on a ribbon of the 2D display canvas for user selection.

Example 7 is a method as in any preceding example further comprising presenting selection options for presenting the animated 3D model on a ribbon of the 2D display canvas for user selection, the selection options including at least one of: 3D files containing animation parameters of respective animated 3D models for user selection, respective views of the selected animated 3D model for user selection, and respective scenes of the selected animated 3D model for user selection.

Example 8 is a method as in any preceding example wherein the respective scenes represent respective embedded customized animations of the selected animated 3D model.

Example 9 is a method as in any preceding example wherein presenting the animated 3D model with user adjusted animation parameters to the 2D display canvas comprises fitting an entire animation scene of the animated 3D model in a designated area within the 2D display canvas so as not to affect the other content besides the animated 3D model in the 2D display canvas.

Example 10 is a method as in any preceding example further comprising representing the animated 3D model using a frame of a selected animation scene in areas of the 2D display canvas where the other content besides the animated 3D model should not animate.

Example 11 is a playback system for 3D animations, comprising at least one processor and a memory device having instructions stored therein, wherein the instructions, which when executed by the processing circuitry, configure the at least one processor to receive user selection of a 3D file that contains animation parameters of an animated 3D model; insert the animated 3D model into a 2D display canvas while preserving the animation parameters of the animated 3D model described in the 3D file, wherein the 2D display canvas is associated with a main thread that enables interaction with and editing of other content besides the animated 3D model in the 2D display canvas; play and pause the animated 3D model on the 2D display canvas under user control independent of the main thread; receive user adjustment of animation parameters of the animated 3D model during playback; and present the animated 3D model with user adjusted animation parameters to the 2D display canvas on a display device.

Example 12 is a system as in Example 11 further comprising a worker thread separate from the main thread that plays and pauses the animated 3D model, wherein the instructions for receiving user adjustment of animation parameters of the animated 3D model during playback comprises instructions for passing animation progress data from the worker thread to the main thread during playback of the animated 3D model while the main thread receives user adjustment of the animation parameters of the 3D model.

Example 13 is a system as in Examples 11-12 wherein the instructions further comprise instructions for presenting respective frames of the animated 3D model on the 2D display canvas at different rotated positions of the animated 3D model for user selection, wherein the different rotated positions of the animated 3D model presented for selection represent the different respective rotated positions of the animated 3D model in respective playbacks of the animated 3D model.

Example 14 is a system as in Examples 11-13 wherein the instructions further comprise instructions for presenting respective frames of the animated model on a ribbon of the 2D display canvas for user selection.

Example 15 is a system as in Examples 11-14 further comprising instructions for presenting selection options for presenting the animated 3D model on a ribbon of the 2D display canvas for user selection, the selection options including at least one of: 3D files containing animation parameters of respective animated 3D models for user selection, respective views of the selected animated 3D model for user selection, and respective scenes of the selected animated 3D model for user selection.

Example 16 is a system as in Examples 11-15 wherein the respective scenes represent respective embedded customized animations of the selected animated 3D model.

Example 17 is a system as in Examples 11-16 wherein the instructions for presenting the animated 3D model with user adjusted animation parameters to the 2D display canvas comprise instructions for fitting an entire animation scene of the animated 3D model in a designated area within the 2D display canvas so as not to affect the other content besides the animated 3D model in the 2D display canvas.

Example 18 is a system as in Examples 11-17 further comprising instructions for representing the animated 3D model using a frame of a selected animation scene in areas of the 2D display canvas where the other content besides the animated 3D model should not animate.

Example 19 is a machine readable medium that stores instructions thereon that when executed by one or more processors cause the one or more processors to playback 3D animations, comprising instructions to receive user selection of a 3D file that contains animation parameters of an animated 3D model; insert the animated 3D model into a 2D display canvas while preserving the animation parameters of the animated 3D model described in the 3D file, wherein the 2D display canvas is associated with a main thread that enables interaction with and editing of other content besides the animated 3D model in the 2D display canvas; create a worker thread separate from the main thread, the worker thread playing and pausing the animated 3D model on the 2D display canvas under user control; receive user adjustment of animation parameters of the animated 3D model during playback; and present the animated 3D model with user adjusted animation parameters to the 2D display canvas on a display device.

Example 20 is a medium as in Example 19 further comprising instructions for continuously looping the animated 3D model during playback and instructions to play a default animation of the animated 3D model upon insertion or opening of the animated 3D model into the 2D display canvas.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Thus, the following claims are hereby incorporated into the Detailed Description, with a claim standing on its own as a separate embodiment.

What is claimed is:

1. A computer-implemented method, comprising:
receiving, by one or more processors, user selection of a 3D file that contains animation parameters of an animated 3D model;
inserting, by the one or more processors, the animated 3D model into a 2D display canvas while preserving the animation parameters of the animated 3D model described in the 3D file, wherein the 2D display canvas is associated with a main thread that enables interaction with and editing of other content besides the animated 3D model in the 2D display canvas;
playing and pausing, by a worker thread implemented by the one or more processors, the animated 3D model on the 2D display canvas under user control, wherein the worker thread is separate from and independent of the main thread and renders the animated 3D model;
receiving, by the one or more processors, user adjustment of animation parameters of the animated 3D model by the main thread during one or more playbacks of the animated 3D model and passing control information for controlling the animated 3D model from the main thread to the worker thread; and
presenting, by the one or more processors, the animated 3D model with user adjusted animation parameters to the 2D display canvas on a display device.

2. The method of claim 1, wherein the animated 3D model loops continuously during play back.

3. The method of claim 1, wherein a default animation of the animated 3D model plays upon insertion or opening of the animated 3D model into the 2D display canvas.

4. The method of claim 1, further comprising the worker thread passing animation progress data to the main thread during playback of the animated 3D model while the main thread receives the user adjustment of the animation parameters of the animated 3D model.

5. The method of claim 1, further comprising presenting respective frames of the animated 3D model on the 2D display canvas at different rotated positions of the animated 3D model for user selection, wherein the different rotated positions of the animated 3D model presented for selection represent the different respective rotated positions of the animated 3D model in respective playbacks of the animated 3D model.

6. The method of claim 5, wherein the respective frames of the animated model are presented on a ribbon of the 2D display canvas for user selection.

7. The method of claim 1, further comprising presenting selection options for presenting the animated 3D model on a ribbon of the 2D display canvas for user selection, the selection options including at least one of: respective views of the selected animated 3D model for user selection, respective scenes of the selected animated 3D model for user selection, and 3D files containing animation parameters of respective animated 3D models including the animated 3D model for user selection.

8. The method of claim 7, wherein the respective scenes represent respective embedded customized animations of the selected animated 3D model.

9. The method of claim 1, wherein presenting the animated 3D model with user adjusted animation parameters to the 2D display canvas comprises fitting an entire animation scene of the animated 3D model in a designated area within the 2D display canvas so as not to affect the other content besides the animated 3D model in the 2D display canvas.

10. The method of claim 9, further comprising representing the animated 3D model using a frame of a selected animation scene in areas of the 2D display canvas where the other content besides the animated 3D model should not animate.

11. A playback system for 3D animations, comprising:
processing circuitry including at least one processor; and
a memory device having instructions stored therein, wherein the instructions, which when executed by the processing circuitry, configure the at least one processor to:
receive user selection of a 3D file that contains animation parameters of an animated 3D model;
insert the animated 3D model into a 2D display canvas while preserving the animation parameters of the animated 3D model described in the 3D file, wherein the 2D display canvas is associated with a main thread that enables interaction with and editing of other content besides the animated 3D model in the 2D display canvas;
play and pause by a worker thread the animated 3D model on the 2D display canvas under user control, wherein the worker thread is separate from and independent of the main thread and renders the animated 3D model;
receive user adjustment of animation parameters of the animated 3D model by the main thread during one or more playbacks of the animated 3D model and passing control information for controlling the animated 3D model from the main thread to the worker thread; and
present the animated 3D model with user adjusted animation parameters to the 2D display canvas on a display device.

12. The system of claim 11, wherein the instructions further comprise instructions for passing animation progress data from the worker thread to the main thread during playback of the animated 3D model while the main thread receives the user adjustment of the animation parameters of the animated 3D model.

13. The system of claim 11, wherein the instructions further comprise instructions for presenting respective frames of the animated 3D model on the 2D display canvas at different rotated positions of the animated 3D model for user selection, wherein the different rotated positions of the animated 3D model presented for selection represent the different respective rotated positions of the animated 3D model in respective playbacks of the animated 3D model.

14. The system of claim 13, wherein the instructions further comprise instructions for presenting respective frames of the animated model on a ribbon of the 2D display canvas for user selection.

15. The system of claim 11, further comprising instructions for presenting selection options for presenting the animated 3D model on a ribbon of the 2D display canvas for user selection, the selection options including at least one of: respective views of the selected animated 3D model for user selection, respective scenes of the selected animated 3D model for user selection, and 3D files containing animation parameters of respective animated 3D models including the animated 3D model for user selection.

16. The system of claim 15, wherein the respective scenes represent respective embedded customized animations of the selected animated 3D model.

17. The system of claim 11, wherein the instructions for presenting the animated 3D model with user adjusted animation parameters to the 2D display canvas comprise instructions for fitting an entire animation scene of the animated 3D model in a designated area within the 2D display canvas so as not to affect the other content besides the animated 3D model in the 2D display canvas.

18. The system of claim 17, further comprising instructions for representing the animated 3D model using a frame of a selected animation scene in areas of the 2D display canvas where the other content besides the animated 3D model should not animate.

19. A non-transitory machine readable medium that stores instructions thereon that when executed by one or more processors cause the one or more processors to playback 3D animations, comprising instructions to:
receive user selection of a 3D file that contains animation parameters of an animated 3D model;
insert the animated 3D model into a 2D display canvas while preserving the animation parameters of the animated 3D model described in the 3D file, wherein the 2D display canvas is associated with a main thread that enables interaction with and editing of other content besides the animated 3D model in the 2D display canvas;
create a worker thread separate and independent from the main thread, the worker thread rendering the animated 3D model and playing and pausing the animated 3D model on the 2D display canvas under user control;
receive user adjustment of animation parameters of the animated 3D model by the main thread during play back of the animated 3D model and pass control information for controlling the animated 3D model from the main thread to the worker thread; and
present the animated 3D model with user adjusted animation parameters to the 2D display canvas on a display device.

20. The medium of claim 19, further comprising instructions for continuously looping the animated 3D model during playback and instructions to play a default animation of the animated 3D model upon insertion or opening of the animated 3D model into the 2D display canvas.

* * * * *